(12) United States Patent
Chirila-Rus et al.

(10) Patent No.: US 8,184,696 B1
(45) Date of Patent: May 22, 2012

(54) METHOD AND APPARATUS FOR AN ADAPTIVE SYSTOLIC ARRAY STRUCTURE

(75) Inventors: Toader-Adrian Chirila-Rus, Austin, TX (US); Wilson C. Chung, Menlo Park, CA (US)

(73) Assignee: Xilinx, Inc., San Jose, CA (US)

( * ) Notice: Subject to any disclaimer, the term of this patent is extended or adjusted under 35 U.S.C. 154(b) by 1288 days.

(21) Appl. No.: 11/900,617

(22) Filed: Sep. 11, 2007

(51) Int. Cl.
*H04N 7/12* (2006.01)

(52) U.S. Cl. ......... 375/240.12; 375/240.02; 375/240.16; 375/240.23; 375/240.24; 382/232; 382/236; 382/238

(58) Field of Classification Search ............. 375/240.02, 375/240.12, 240.16, 240.23, 240.24; 382/232, 382/236, 238
See application file for complete search history.

(56) References Cited

U.S. PATENT DOCUMENTS

| | | | | |
|---|---|---|---|---|
| 5,784,108 A * | 7/1998 | Skaletzky et al. | ........ | 375/240.15 |
| 5,838,827 A * | 11/1998 | Kobayashi et al. | ........... | 382/236 |
| 5,946,405 A * | 8/1999 | Kim et al. | ...................... | 382/107 |
| 6,377,623 B1 * | 4/2002 | Ra et al. | ........................ | 375/240 |
| 6,411,341 B1 * | 6/2002 | De Haan et al. | ............... | 348/714 |
| 7,072,395 B2 * | 7/2006 | Hwang et al. | ............. | 375/240.12 |
| 7,072,398 B2 * | 7/2006 | Ma | ............................ | 375/240.16 |
| 8,005,881 B1 * | 8/2011 | Szanto et al. | .................. | 708/304 |
| 2004/0028134 A1 * | 2/2004 | Subramaniyan et al. | ........................ | 375/240.16 |
| 2005/0286777 A1 * | 12/2005 | Kumar et al. | ................. | 382/232 |
| 2006/0098735 A1 * | 5/2006 | Chang | ....................... | 375/240.12 |
| 2006/0120452 A1 * | 6/2006 | Li | ............................. | 375/240.16 |
| 2007/0110164 A1 * | 5/2007 | Yang | ........................ | 375/240.24 |
| 2007/0217515 A1 * | 9/2007 | Wang et al. | ............... | 375/240.17 |
| 2008/0002772 A1 * | 1/2008 | Song et al. | ................. | 375/240.16 |
| 2008/0123733 A1 * | 5/2008 | Yu et al. | .................... | 375/240.01 |
| 2008/0123744 A1 * | 5/2008 | Pearson | .................... | 375/240.16 |
| 2008/0130748 A1 * | 6/2008 | Robers et al. | ............. | 375/240.16 |
| 2008/0130749 A1 * | 6/2008 | Tsai et al. | ................. | 375/240.16 |
| 2008/0215644 A1 * | 9/2008 | Beric et al. | ..................... | 707/205 |
| 2008/0225948 A1 * | 9/2008 | Lin et al. | ................... | 375/240.12 |
| 2009/0079874 A1 * | 3/2009 | Krijn | .............................. | 348/699 |
| 2009/0168884 A1 * | 7/2009 | Lu et al. | .................... | 375/240.16 |
| 2009/0252230 A1 * | 10/2009 | Zhan et al. | ............... | 375/240.16 |
| 2011/0206114 A1 * | 8/2011 | Kim et al. | ................. | 375/240.02 |

FOREIGN PATENT DOCUMENTS

EP  1339234 A2 *  8/2003

* cited by examiner

*Primary Examiner* — Nathan Flynn
*Assistant Examiner* — Sarah Su
(74) *Attorney, Agent, or Firm* — Michael T. Wallace; Gerald Chan; Thomas George

(57) ABSTRACT

A method and apparatus for an adaptive systolic array structure is initially configured for motion estimation calculations and optionally reconfigured as the motion estimation algorithm progresses. A scheduling map of the processing element (PE) calculations for a given motion estimation algorithm is generated. A systolic array structure may then be generated from the scheduling map, whereby the size and shape of a processing element array is configured to generate the search pattern that is to be used during the search. In addition, delay elements may be implemented within the systolic array structure, so as to preserve the pixels of a current macroblock that are reused in accordance with the scheduling map. The systolic array structure may also be adapted by the motion estimation algorithm during subsequent search stages to accommodate refinements required by the search strategy.

19 Claims, 15 Drawing Sheets

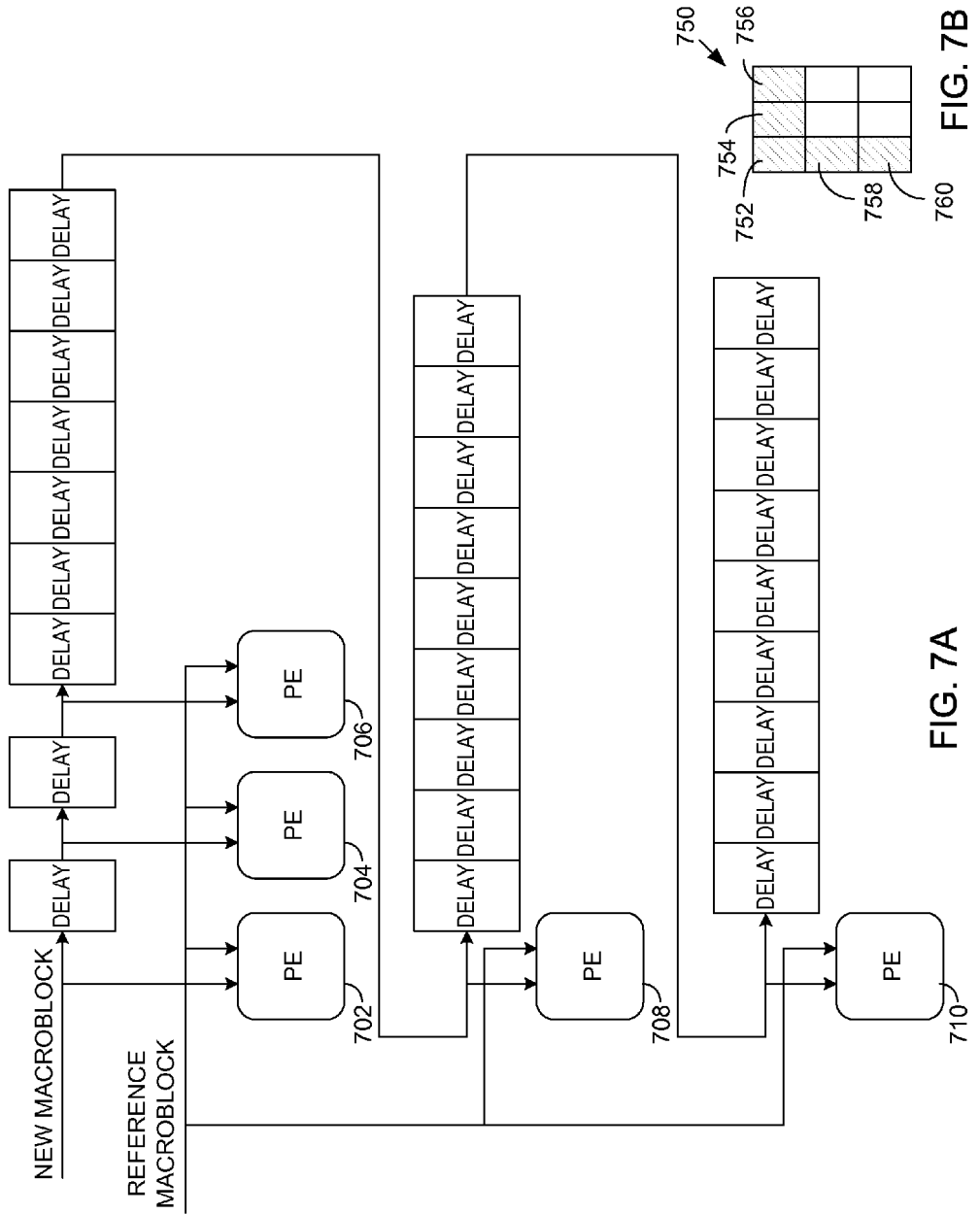

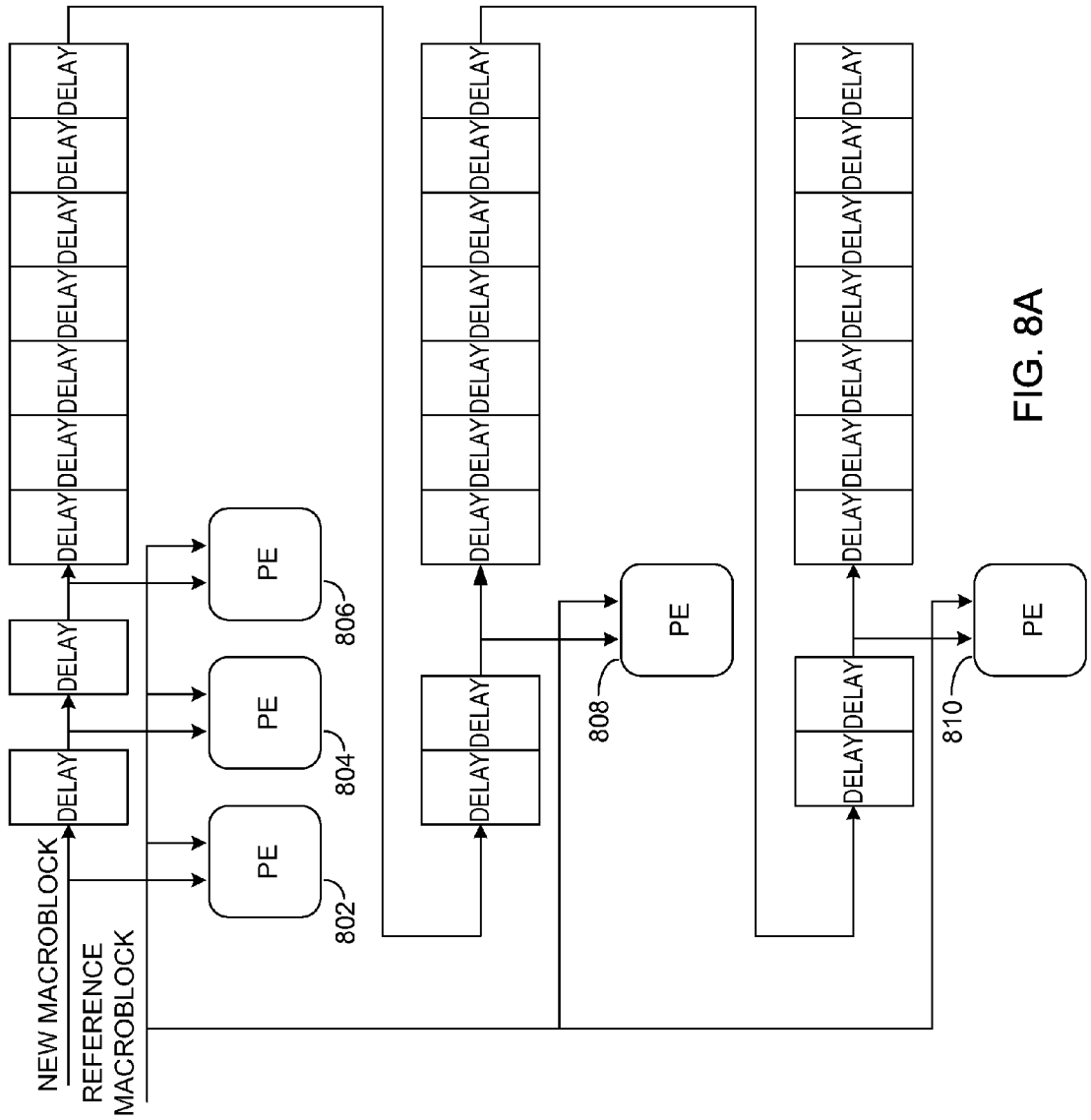
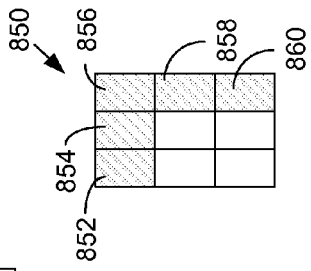
FIG. 8A
FIG. 8B

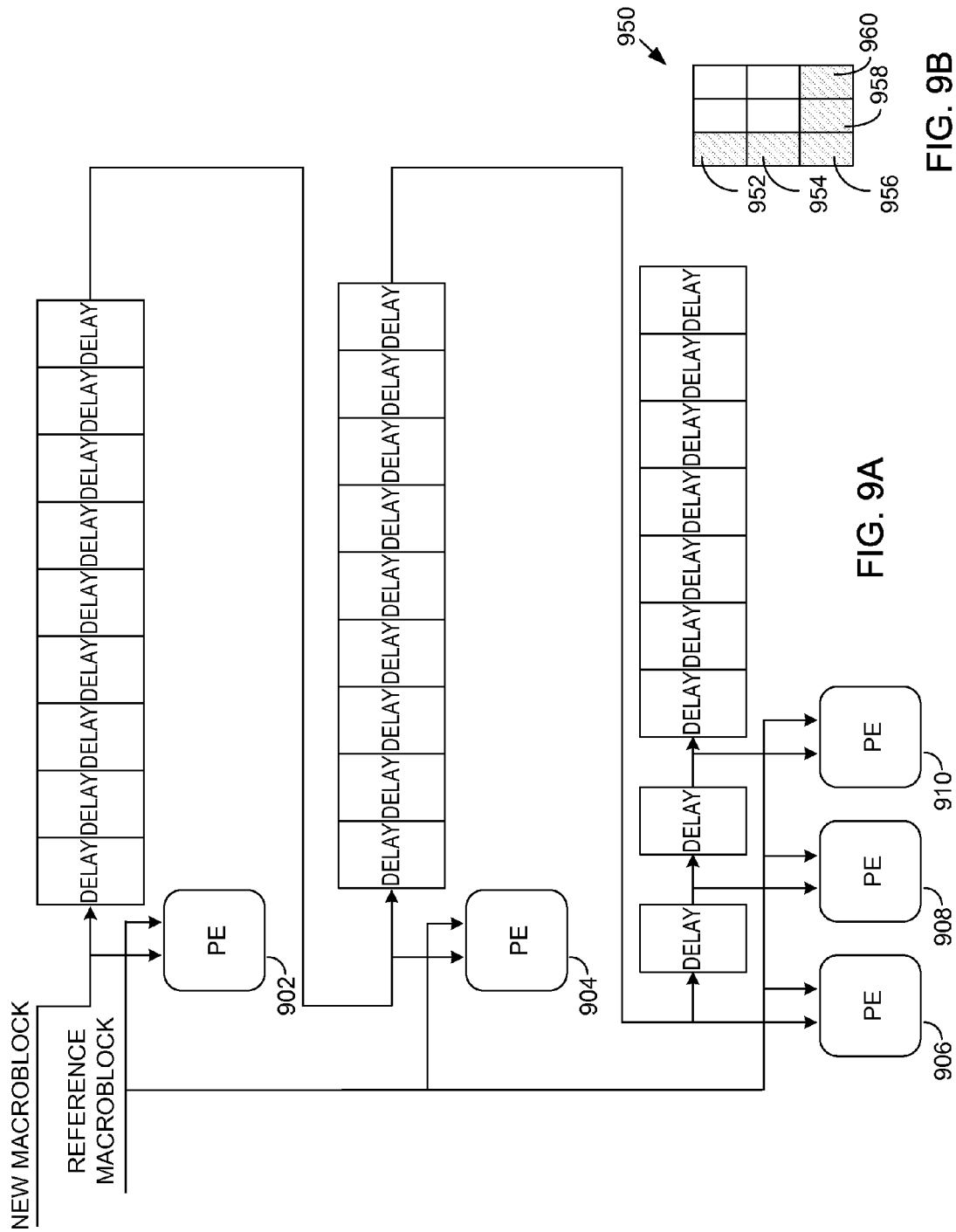

METHOD AND APPARATUS FOR AN ADAPTIVE SYSTOLIC ARRAY STRUCTURE

FIELD OF THE INVENTION

The present invention generally relates to motion estimation and motion detection structures, and more particularly, to an adaptive systolic array structure for adaptive motion estimation and detection.

BACKGROUND OF THE INVENTION

A key element of many video compression schemes is motion estimation, whereby in a given sequence of video frames, a current video frame is predicted from a previous video frame known as a reference frame. Motion estimation exploits the temporal redundancy between the reference video frame and adjacent video frames to generate an estimated difference between the reference video frame and adjacent video frames. The video compression algorithm may then encode the difference between the reference video frame and the adjacent video frames using less bandwidth than would ordinarily be used without video compression. Another key element of many video compression schemes includes motion detection such as may be utilized within video surveillance systems.

Motion estimation and detection algorithms often divide the reference video frame and each adjacent video frame into smaller groups of pixels known as macroblocks. A search is then conducted, whereby each new macroblock of the current video frame is compared to a macroblock of a pre-determined search area within the reference frame to select the macroblock of the current video frame that exhibits a minimized error measure. In other words, an optimal motion vector is obtained that minimizes the amount of prediction error between the predicted and actual pixel values over all pixels of a motion-compensated region.

To find optimal motion vectors, block prediction errors must first be calculated for each motion vector within the predetermined search range. The amount of prediction error is typically measured using one of a number of algorithms, such as a mean squared error (MSE), also known as a sum of squared differences (SSD) algorithm. Another algorithm for computing prediction error is the mean error algorithm, also known as the sum of absolute differences (SAD) algorithm. Motion vectors that exhibit the least MSE (LSME) or minimized SAD represent the optimal, or best match, motion vector.

The most comprehensive motion estimation algorithm, i.e., full search, obtains optimal motion vectors through an evaluation of every candidate macroblock that exists within the search area. The full search, however, becomes computationally prohibitive especially when operating under real time constraints. Even the inherent parallel processing architectures that are found in field programmable gate arrays (FPGAs) may become overwhelmed due to the large number of computations that are required to implement the full search.

Accordingly, a multitude of search techniques have been developed that limit the number of searches that are performed by reducing the number of candidate positions within the search area that are to be considered during the motion estimation algorithm. Conventional motion estimation algorithms, however, often utilize a much larger search area than is absolutely required. In addition, multiple memory accesses to the same memory space are often performed due to the various consecutive operations that are performed by the motion estimation algorithm. As such, exorbitant bandwidth requirements are imposed upon the local, and/or external, memory resources of the motion estimation structure.

Efforts continue, therefore, to obtain a motion estimation algorithm and associated motion estimation structure that facilitates a significant reduction in the number of memory accesses performed during execution of the motion estimation algorithm. In addition, the motion estimation structure should support a plurality of adaptive motion estimation algorithms that generally operate on pixels from a new macroblock and pixels contained within a search area.

SUMMARY OF THE INVENTION

To overcome limitations in the prior art, and to overcome other limitations that will become apparent upon reading and understanding the present specification, various embodiments of the present invention disclose a method and apparatus for an adaptive systolic motion estimation structure that exploits local data reuse and minimizes local memory storage usage.

In accordance with one embodiment of the invention, an adaptive motion estimation structure comprises a first memory block that is coupled to receive pixels indicative of a reference video frame, a second memory block that is coupled to receive pixels indicative of a current video frame, and a processing block that is coupled to the first and second memory blocks. The processing block includes a data routing block that is coupled to receive pixels from the first and second memory blocks, where the data routing block is adapted to store pixels from the second Memory block in accordance with a scheduling map. The processing block further includes an array of processing elements that is coupled to the data routing block, where the array of processing elements receives pixels from the first and second memory blocks at time intervals defined by the scheduling map. The programmable configuration of the array of processing elements is configured to determine a search pattern that is used to estimate a difference between the reference and current video frames.

In accordance with another embodiment of the invention, a method of adapting a motion estimation structure to perform an adaptive motion estimation algorithm comprises configuring a programmable number of processing elements of a processing element array to process a programmable number of pixels from a reference video frame and a current video frame during each time interval defined by a scheduling map. The method further comprises configuring a programmable number of delay elements of a delay line to deliver the programmable number of pixels to the array of processing elements at each time interval defined by the scheduling map and selectively interconnecting the processing element array to the delay line to generate a search pattern used to estimate a difference between the reference and current video frames.

In accordance with another embodiment of the invention, an adaptive motion estimation system comprises a first memory block that is coupled to receive pixels indicative of a reference video frame and a second memory block that is coupled to receive pixels indicative of a current video frame. The adaptive motion estimation system further comprises a field programmable gate array that is coupled to the first and second memory blocks. The field programmable gate array includes a data routing block that is coupled to receive pixels from the first and second memory blocks. The data routing block being adapted to store pixels from the second memory block in accordance with a scheduling map. The field programmable gate array further includes an array of processing elements that is coupled to the data routing block. The array of processing elements receiving pixels from the first and second memory blocks at time intervals defined by the scheduling map. A programmable configuration of the array of processing elements determines a search pattern used to estimate a difference between the reference and current video frames.

BRIEF DESCRIPTION OF THE DRAWINGS

Various aspects and advantages of the invention will become apparent upon review of the following detailed description and upon reference to the drawings in which:

FIG. 7A exemplifies an alternate embodiment of an adaptive systolic array structure in accordance with an embodiment of the present invention;

FIG. 7B exemplifies an alternate sparse search pattern that is realized by the adaptive systolic array structure of FIG. 7A;

FIG. 8A exemplifies an alternate embodiment of an adaptive systolic array structure, in accordance with an embodiment of the present invention;

FIG. 8B exemplifies an alternate sparse search pattern that is realized by the adaptive systolic array structure of FIG. 8A;

FIG. 9A exemplifies an alternate embodiment of an adaptive systolic array structure;

FIG. 9B exemplifies an alternate sparse search pattern that is realized by the adaptive systolic array structure of FIG. 9A;

DETAILED DESCRIPTION

Generally, various embodiments of the present invention are applied to the field of integrated circuits (ICs) of which programmable logic devices (PLDs) are a subset. In particular, a method and apparatus is provided for an adaptive systolic array structure that may be initially configured for an initial search strategy and then reconfigured as the motion estimation algorithm progresses. The adaptive systolic array structure may be adapted to facilitate various data widths, e.g., 8, 16, or 32 bits, to allow single pixel processing, or simultaneous processing of multiple pixels.

In one embodiment, a programmable logic device (PLD) such as a field programmable gate array (FPGA) is utilized to take advantage of the inherent parallel processing structure of the FPGA. A scheduling map of the processing element (PE) calculations for a given motion estimation algorithm is generated, whereby each PE calculation and the required pixel inputs for each PE calculation are scheduled to be synchronous with a processing clock during a search of the search area. A systolic array structure may then be generated from the scheduling map, whereby the size and shape of a processing element array is configured to generate the search pattern that is to be used during the search. In addition, delay elements may be implemented within the systolic array structure, so as to preserve the pixels of a current macroblock that are needed by the processing element array in accordance with the scheduling map. As such, external memory access is significantly reduced. Data reuse is also significantly increased, since data that is used for a given PE calculation is preserved by the delay elements for subsequent PE calculations requiring the same data in accordance with the scheduling map.

The systolic array structure may also be adapted by the motion estimation algorithm during subsequent stages to accommodate a refinement of the search strategy. In one embodiment, dynamic reconfiguration of a portion of the FPGA may be implemented to reconfigure the systolic array structure in accordance with the refined search strategy. In other embodiments, pre-determined configurations may be multiplexed within the FPGA and selected by the motion estimation algorithm through appropriate mode select inputs to the multiplexers.

The adaptive systolic array structure may be used in virtually any system that utilizes block matching based on a statistical metric. The video standards that may be supported by the adaptive systolic array include MPEG-2, MPEG-4, H.263, H.264, WMV9/VC-1, or any other standard, application, or algorithm that uses block matching motion estimation and detection.

Figure 1:
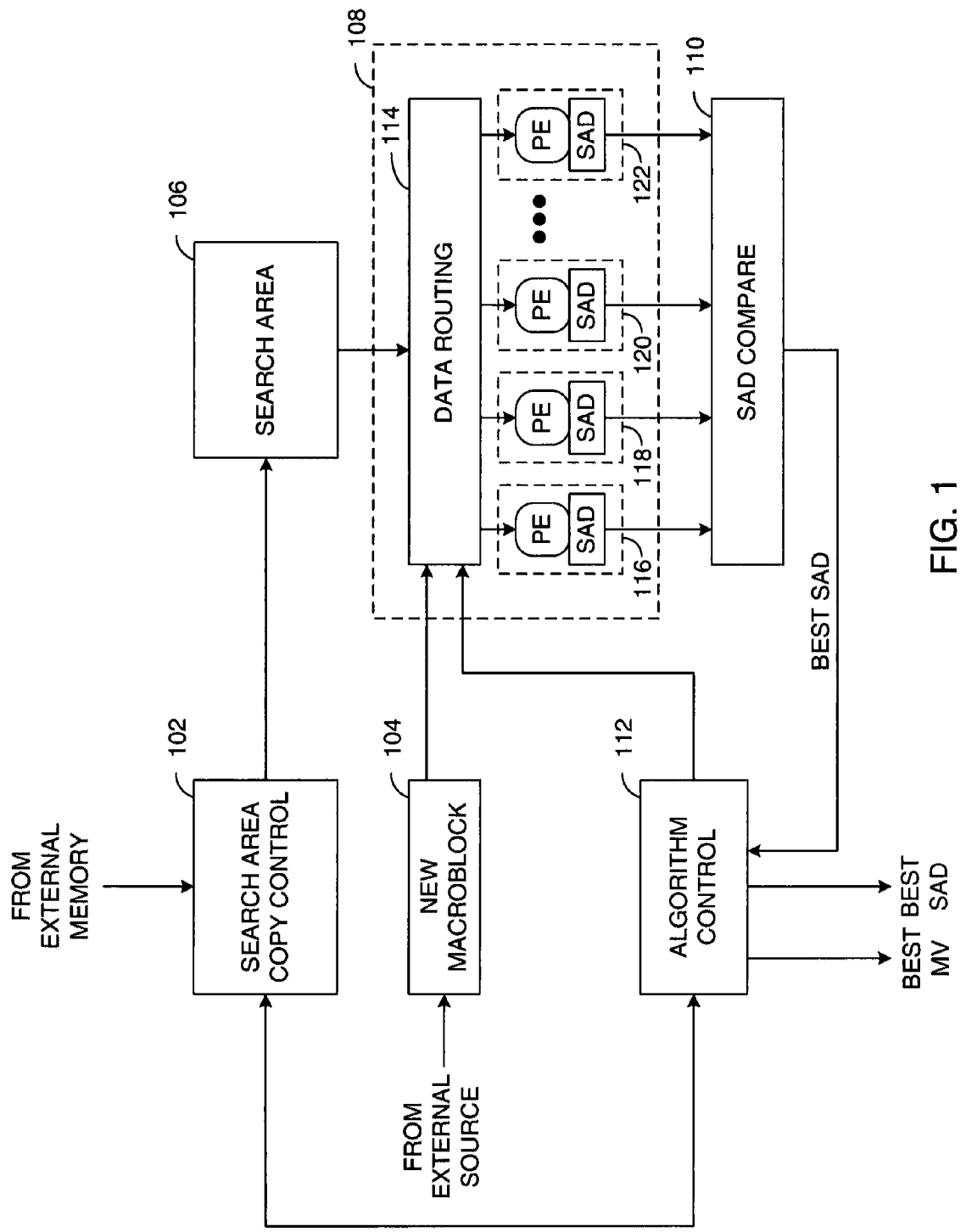
FIG. 1 illustrates an exemplary embodiment of an adaptive motion estimation structure in accordance with an embodiment of the present invention.

Turning to FIG. 1, an adaptive motion estimation structure in accordance with an embodiment of the present invention is exemplified, whereby an array of processing elements (PEs) and associated sum of absolute differences (SAD) blocks are combined within processing block 108 as illustrated. In one embodiment, processing block 108 may be implemented within a programmable logic device, such as an FPGA, so as to facilitate reconfiguration of processing block 108 by the motion estimation algorithm as discussed in more detail below.

The motion estimation algorithm utilizes the motion estimation structure of FIG. 1 by first providing a predicted motion vector from algorithm control 112, whereby the predicted motion vector represents the predicted displacement between a macroblock in an adjacent video frame and a macroblock in the reference video frame. Based upon the predicted motion vector, search area copy control 102 extracts the appropriate reference frame data from external memory (not shown) and applies the reference frame, or a portion thereof, to local memory space, e.g., search area 106. As discussed in more detail below, the portion of reference frame memory that is copied into search area 106, i.e., the active search area, represents the minimum amount of reference frame memory that is required for a given computation stage. New macroblock 104 is obtained from an external source, such as a video camera, where new macroblock 104 represents the new adjacent video frame, or a portion thereof, to be processed.

The active search area pixels, as well as new macroblock 104 pixels, are then provided to processing block 108. Pixels from the active search area and pixels from the new macroblock are then routed to their respective processing elements (PEs) by data routing block 114 to perform calculations as required by the particular motion estimation algorithm being implemented. In one embodiment, the motion estimation algorithm employs the SAD metric to determine the SAD value as it relates to the pixels of new macroblock 104 and the pixels contained within search area 106.

It is noted that while the motion estimation structure of FIG. 1 implements the SAD metric, PEs of processing block 108 are flexible and may be modified to implement a motion estimation algorithm that is based upon a different metric, such as mean error (ME), mean squared error (MSE), pixel projection, or any other metric that uses operations between new macroblock pixels and pixels from a given search area. As discussed in more detail below, the array size and shape of each PE may also be reconfigured to accommodate virtually any motion estimation algorithm that may use irregularly shaped, e.g., non-rectangular, candidate position searches.

Once the SAD computations are performed, SAD compare 110 compares the output of processing blocks 116-122 to determine which of the SAD outputs is minimized. The minimum SAD value, e.g., BEST SAD, is then provided to algorithm control 112, where the determination is made as to whether another stage run is required. If not, the optimal motion vector, e.g., BEST MV, and associated SAD value, e.g., BEST SAD, is provided by algorithm control 112 to be further processed as necessary. If another stage run is required, then the systolic structure of FIG. 1 may be optionally adapted to further refine search design parameters, such as new macroblock area size, processing element array size and shape, and search area to adapt the search strategy as required by the motion estimation algorithm.

As discussed in more detail below, data routing block 114 is optimized for data reuse, whereby the data required by each processing block is conserved and reused as necessary for consecutive operations so as to obviate the need to perform unnecessary memory accesses from search area 106. In addition, search area copy control 102 only copies as much external memory into search area 106 as is required by the particular motion estimation algorithm being executed.

Figure 2A:
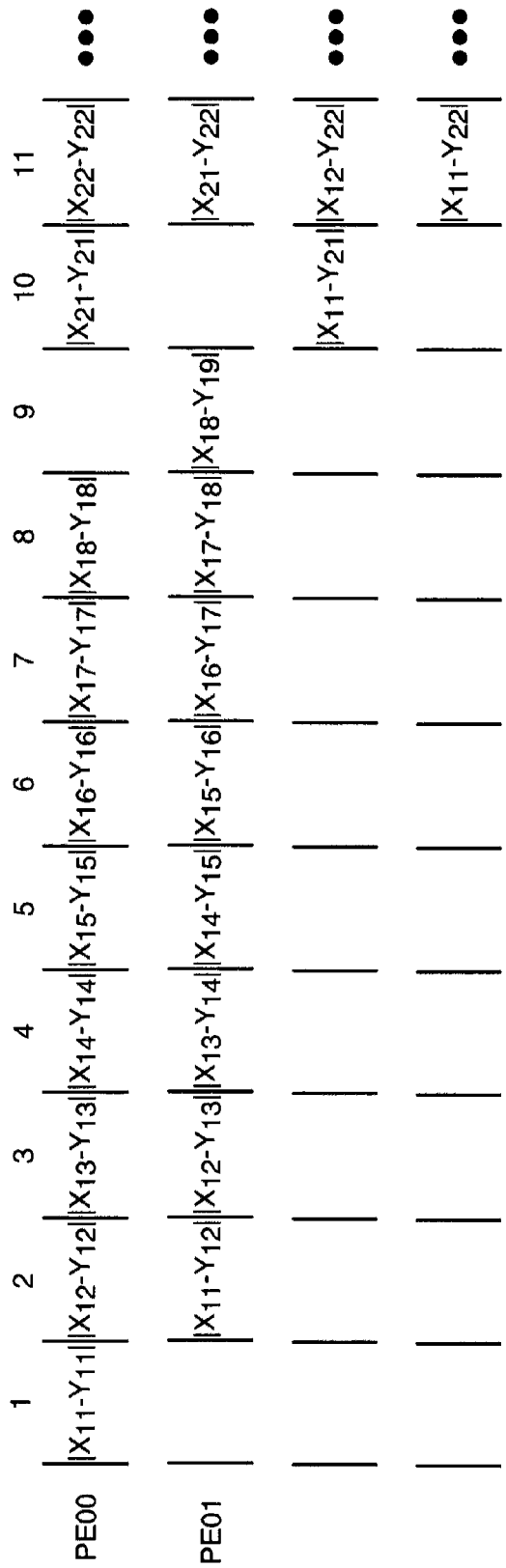
FIG. 2A illustrates an exemplary scheduling map of single pixel processing operations conducted by the adaptive motion estimation structure of FIG. 1.

Turning to FIG. 2A, a scheduling map of SAD operation equations using a 2×2 processing element array for an 8×8 macroblock is exemplified. In particular, new macroblock 104 of FIG. 1, represents an 8×8 array of pixels and the number of processing elements implemented within processing block 108 is equal to four, e.g., the processing element array is square with an array size of 2×2. In addition, since the new macroblock 104 represents an 8×8 pixel block, active search area 106 is minimized by search area copy control 102 to be a 9×9 pixel array.

One purpose of the adaptive systolic array structure of processing block 108 is to facilitate a large number of simultaneous processing element calculations. In particular, each processing element of processing blocks 116-122 implements the function as described in equation (1):

$$PE_{ij} = \sum_{k=1}^{Bwidth} \sum_{l=1}^{Bheight} |X_{k+i} - Y_{l+j}|, \qquad (1)$$

where $0 \le i \le$ PE array width-1, $0 \le j \le$ PE array height-1, Bwidth is the width of the search area in pixels, and Bheight is the height of the search area in pixels. The SAD operation equations of FIG. 2A require a processing element array size of 2×2, a search area width of 9 pixels, and a search area height of 9 pixels, so that the processing equations implemented by the PE/SAD structure of FIG. 2B becomes:

$$PE_{ij} = \sum_{k=1}^{9} \sum_{l=1}^{9} |X_{k+i} - Y_{l+j}|, \qquad (2)$$

where ij=00 for $PE_{00}$, ij=01 for $PE_{01}$, ij=10 for $PE_{10}$, and ij=11 for $PE_{11}$.

Turning to FIG. 2A, a portion of the operation equations performed by each PE of the four PE array is exemplified. The first PE, $PE_{00}$, performs the absolute difference equations as described by row PE00, where X denotes a pixel in new macroblock 104 and Y denotes a pixel in search area 106. The second, third, and fourth PE arrays, $PE_{01}$, $PE_{10}$, and $PE_{11}$, similarly perform absolute difference equations as described in their respective rows, PE01, PE10, and PE11.

Thus, during time period 1, the absolute value of the difference between the pixel in the (1,1) position of new macroblock 104, i.e., $X_{11}$, as supplied by new(8) 202, and the pixel in the (1,1) position of search area 106, i.e., $Y_{11}$, as supplied by SA(8) 204, is taken by absolute value block 206 of the first PE array, $PE_{00}$. Summer 208 and accumulator 210 maintain the accumulated sum of absolute differences for each PE for each calculation performed in accordance with the scheduling map of FIG. 2A.

During time period 2, for example, the absolute value of the difference between the pixel in the (1,2) position of new macroblock 104, i.e., $X_{12}$, as supplied by new(8) 202, and the pixel in the (1,2) position of search area 106, i.e., $Y_{12}$, as supplied by SA(8) 204, is taken by absolute value block 206 of the first PE array, $PE_{00}$, while the absolute value of the difference between the pixel in the (1,1) position of new macroblock 104, i.e., $X_{11}$, as supplied by new(8) 202, and the pixel in the (1,2) position of search area 106, i.e., $Y_{12}$, as supplied by SA(8) 204, is taken by absolute value block 206 of the second PE array, $PE_{01}$. The remaining schedule of the sum of absolute differences can be verified by equation (2) and, at least in part, by the scheduling map of FIG. 2A.

Figure 2B:
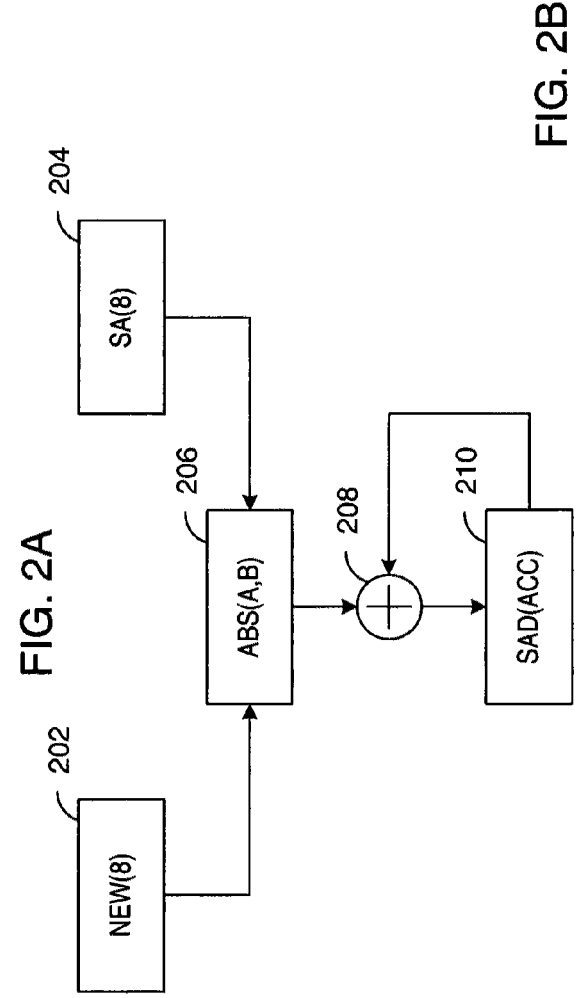
FIG. 2B illustrates an exemplary embodiment of a processing element that performs processing operations in accordance with the scheduling map of FIG. 2A.

As can be seen from equation (2), the scheduling map of FIG. 2A, and the associated processing element of FIG. 2B, the systolic array structure lends itself to the minimization of memory accesses because new macroblock pixels obtained during one read cycle may be reused as required throughout the execution of all PE calculations. That is to say, for example, that a single read from new(8) 202, e.g., 8-bit pixel $X_{11}$, not only facilitates the absolute value calculation performed in row PE00 during time period 1, but also facilitates the absolute value calculations performed in row PE01 during time period 2, row PE10 during time period 10, and row PE11 during time period 11.

As discussed in more detail below, each pixel that is to be reused during a subsequent clock cycle may be stored within a local delay element, such as a shift register, latch array, or an equivalent memory storage device. As such, data routing block 114 of FIG. 1 is only required to access a pixel from new macroblock 104 once. Subsequent calculations using the same pixel may then be retrieved from the delay element. As such, memory access bandwidth may be significantly reduced as compared to other systolic array structures that require a new external memory access each time a new macroblock pixel value is required for a PE calculation.

In order to complete the SAD calculation for each processing block 116-122 as described in equation (2), an accumulation of each sum of absolute differences is taken through operation of summer 208 and accumulator 210. The final SAD value from each processing block 116-122 represents the accumulated sum of all absolute differences performed over all clock cycles as described in equation (2) and as illustrated, at least in part, by the scheduling map of FIG. 2A.

Figure 3A:
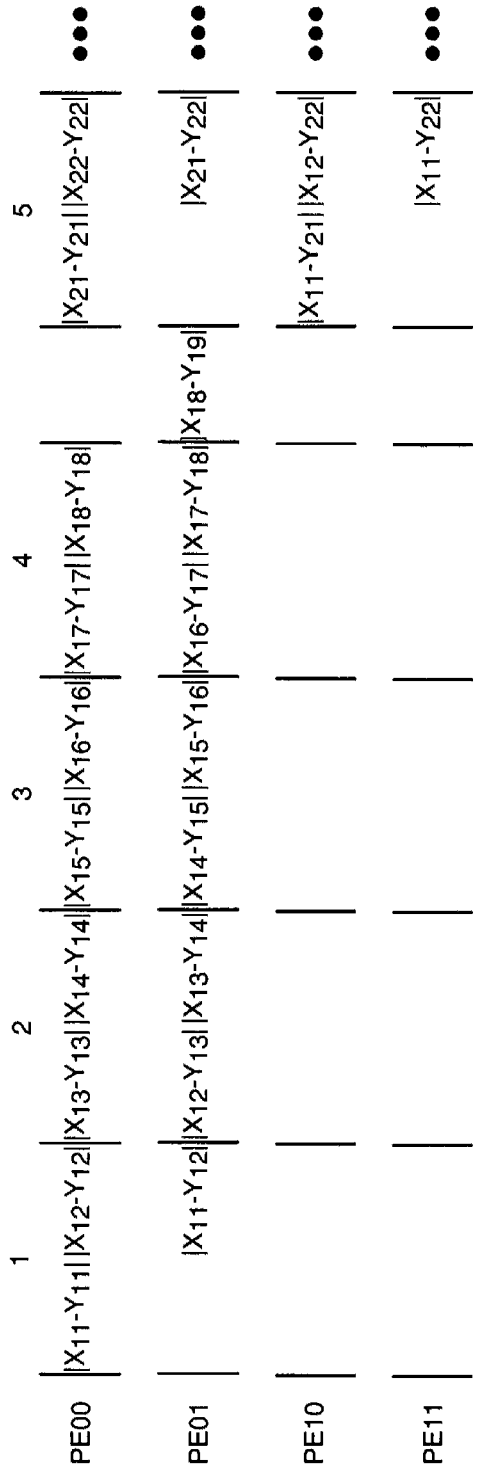
FIG. 3A illustrates an exemplary scheduling map of double pixel processing operations conducted by the adaptive motion estimation structure of FIG. 1.
Figure 3B:
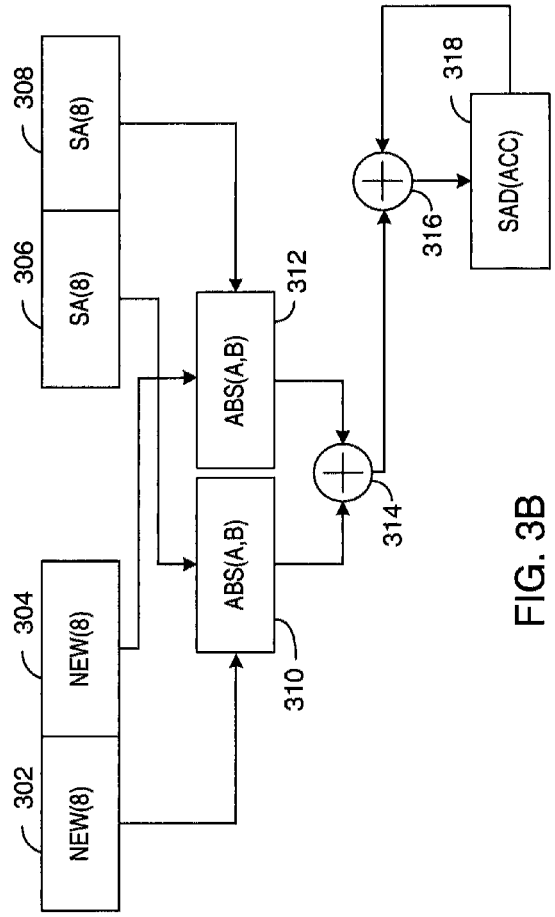
FIG. 3B illustrates an exemplary embodiment of a processing element that performs processing operations in accordance with the scheduling map of FIG. 3A.

Turning to FIG. 3B, an alternate embodiment of a processing element structure is exemplified, whereby multiple pixels, e.g., 2 pixels, may be simultaneously processed by, processing blocks 116-122 of FIG. 1. As can be verified from the schedule map of FIG. 3A, the number of clock cycles that are utilized is cut in half, but the number of calculations for each clock cycle is doubled, as compared to the schedule map of FIG. 2A. As can further be verified, new macroblock pixels previously accessed from external memory may be similarly reused, as discussed above in relation to FIG. 2A, during subsequent calculations without the need to execute an external memory read for each new macroblock pixel when needed.

New(8) 302 and new(8) 304 exemplify a single, 16-bit memory access in which two pixels from new macroblock 104 are obtained in one read operation. Similarly, SA(8) 306 and SA(8) 308 exemplify a single, 16-bit memory access in which two pixels from search area 106 are obtained in one read operation. Absolute value blocks 310 and 312 are utilized to perform the absolute difference calculations as illustrated in rows PE00-PE11 of the scheduling map of FIG. 3A. For each absolute difference calculation, summer 314 is required to perform the sum of the two absolute difference terms that may exist in each clock cycle. Once summed, an accumulation of each sum of absolute differences is taken through operation of summer 316 and accumulator 318 to generate the final SAD value.

Figure 4A:
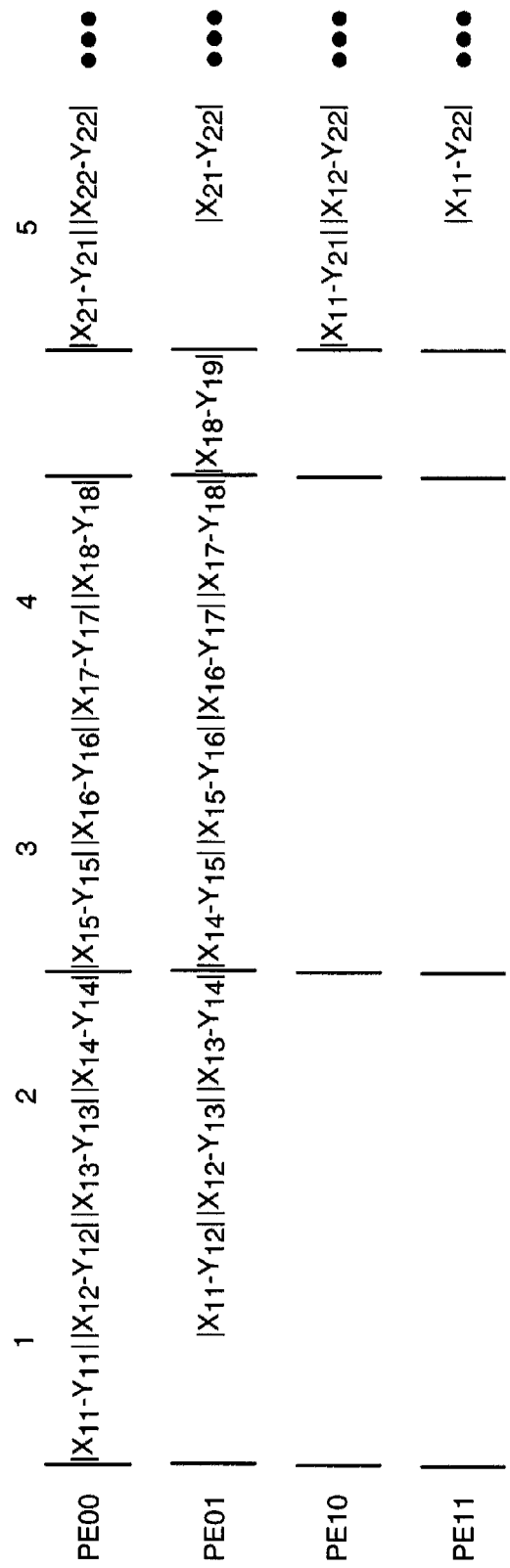
FIG. 4A illustrates an exemplary scheduling map of quadruple pixel processing operations conducted by the adaptive motion estimation structure of FIG. 1.
Figure 4B:
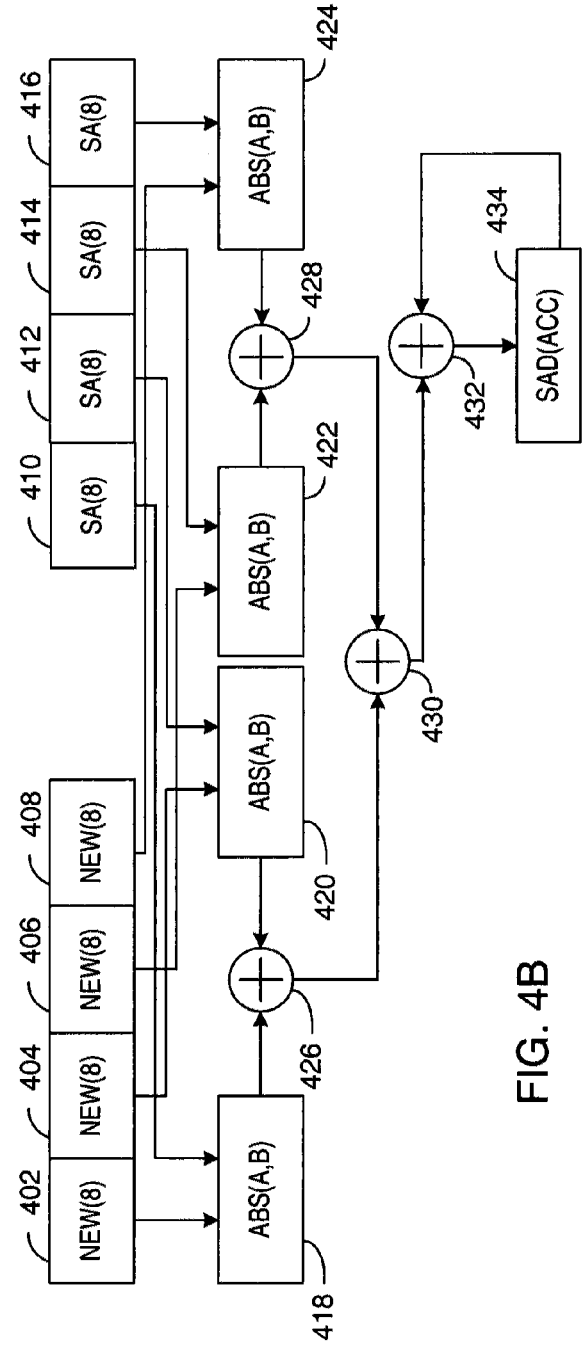
FIG. 4B illustrates an exemplary embodiment of a processing element that performs processing operations in accordance with the scheduling map of FIG. 4A.

Turning to FIG. 4B, an alternate embodiment of a processing element structure is exemplified, whereby multiple pixels, e.g., 4 pixels, may be simultaneously processed by processing blocks 116-122 of FIG. 1. As can be verified from the schedule map of FIG. 4A, the number of clock cycles that are utilized is cut in half, but the number of calculations for each clock cycle is doubled, as compared to the schedule map of FIG. 3A. As can further be verified, new macroblock pixels previously accessed from external memory may be similarly reused, as discussed above in relation to FIGS. 2A and 3A, during subsequent calculations without the need to execute a memory read for each pixel value when needed.

New(8) 402-new(8) 408 exemplify a single, 32-bit memory access in which four pixels from new macroblock 104 are obtained in one read operation. Similarly, SA(8) 410-SA(8) 416 exemplify a single, 32-bit memory access in which four pixels from search area 106 are obtained in one read operation. Absolute value blocks 418-424 are utilized to perform the absolute difference calculations as illustrated in rows PE00-PE11 of the scheduling map of FIG. 4A. For each absolute difference calculation, summers 426-430 are required to perform the sum of the four absolute difference terms that may exist in each clock cycle. Once summed, an accumulation of each sum of absolute differences is taken through operation of summer 432 and accumulator 434 to generate the final SAD value.

As discussed above, the systolic array architectures as exemplified in FIGS. 1-4 provide a means to enable an array of processing elements to work in parallel so as to achieve 100% data reuse to minimize memory bandwidth requirements. By inspection of the data dependencies of the scheduling map of FIG. 2A, for example, an implementation may be derived for an adaptive systolic structure that may be reconfigured to accommodate virtually any motion estimation algorithm that operates on pixels from a new macroblock and pixels from a given search area.

Turning back to FIG. 2A, it is observed from the scheduling map that new macroblock pixels are reused according to a schedule that is dependent upon the search area and search pattern being utilized. For example, the 2×2 processing array structure operating on an 8×8 new macroblock and a 9×9 reference macroblock, i.e., active search area, requires that pixel $X_{11}$ be used during clock cycle 1 and reused during clock cycles 2, 10, 11, as well as other clock cycles that are not shown in FIG. 2A for brevity. Thus, the data routing structure of FIG. 5 may be derived from the data dependencies as illustrated by the scheduling map of FIG. 2A.

In particular, the first pixel, $X_{11}$, of the new macroblock and the first pixel, $Y_{11}$, of the reference macroblock are first read from new macroblock 104 and search area 106, respectively, and then are directly applied to $PE_{00}$ 520 during clock cycle 1 for the SAD computation as illustrated in FIG. 2A. Thus, no delay is required prior to clock cycle 1 in order to provide the correct data inputs to $PE_{00}$ 520.

During clock cycle 2, however, the first pixel, $X_{11}$, of the new macroblock is once again required as an input to $PE_{01}$ 522. Thus, delay element 502 is required to store pixel $X_{11}$ for one clock cycle until $PE_{01}$ 522 requires pixel $X_{11}$ during clock cycle 2. In this instance, pixel $X_{11}$ is not required to be read again from new macroblock 104, but instead is provided by delay element 502 to $PE_{01}$ 522. The second pixel, $Y_{12}$, of the reference macroblock is read from search area 106 and applied to $PE_{01}$ 522 during clock cycle 2, so that $PE_{01}$ 522 may implement the SAD calculation as illustrated in the scheduling map of FIG. 2A.

During clock cycle 10, pixel $X_{11}$ is once again required by $PE_{10}$ 542. Thus, enough delay elements are required to store pixel $X_{11}$ for the 8 clock cycles that exist between clock cycle 2 and clock cycle 10. As such, delay elements 504-518 are employed to generate the required 8-cycle delay that is needed to preserve pixel $X_{11}$ for use by $PE_{10}$ 542 during clock cycle 10. During clock cycle 11, pixel $X_{11}$ is once again required by $PE_{11}$ 544. Thus, delay element 524 is required to preserve pixel $X_{11}$ for use by $PE_{11}$ 544 during clock cycle 11. Delay elements 526-540 may be similarly verified to be necessary for new macroblock pixel reuse by further expansion of the scheduling map of FIG. 2A.

Figure 5:
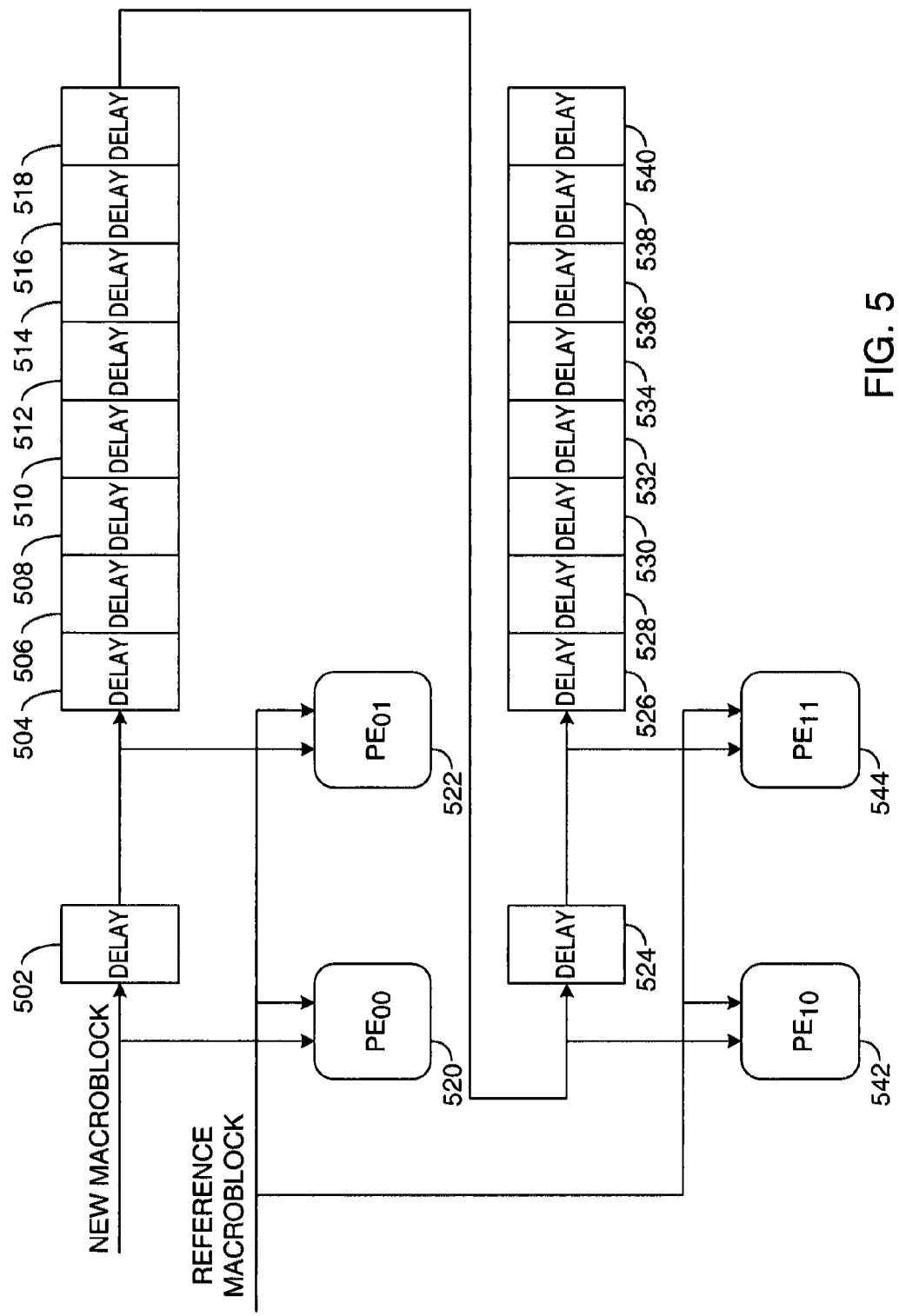
FIG. 5 exemplifies a data routing structure that may be derived from the data dependencies illustrated in the scheduling map of FIG. 2A.
Figure 6:
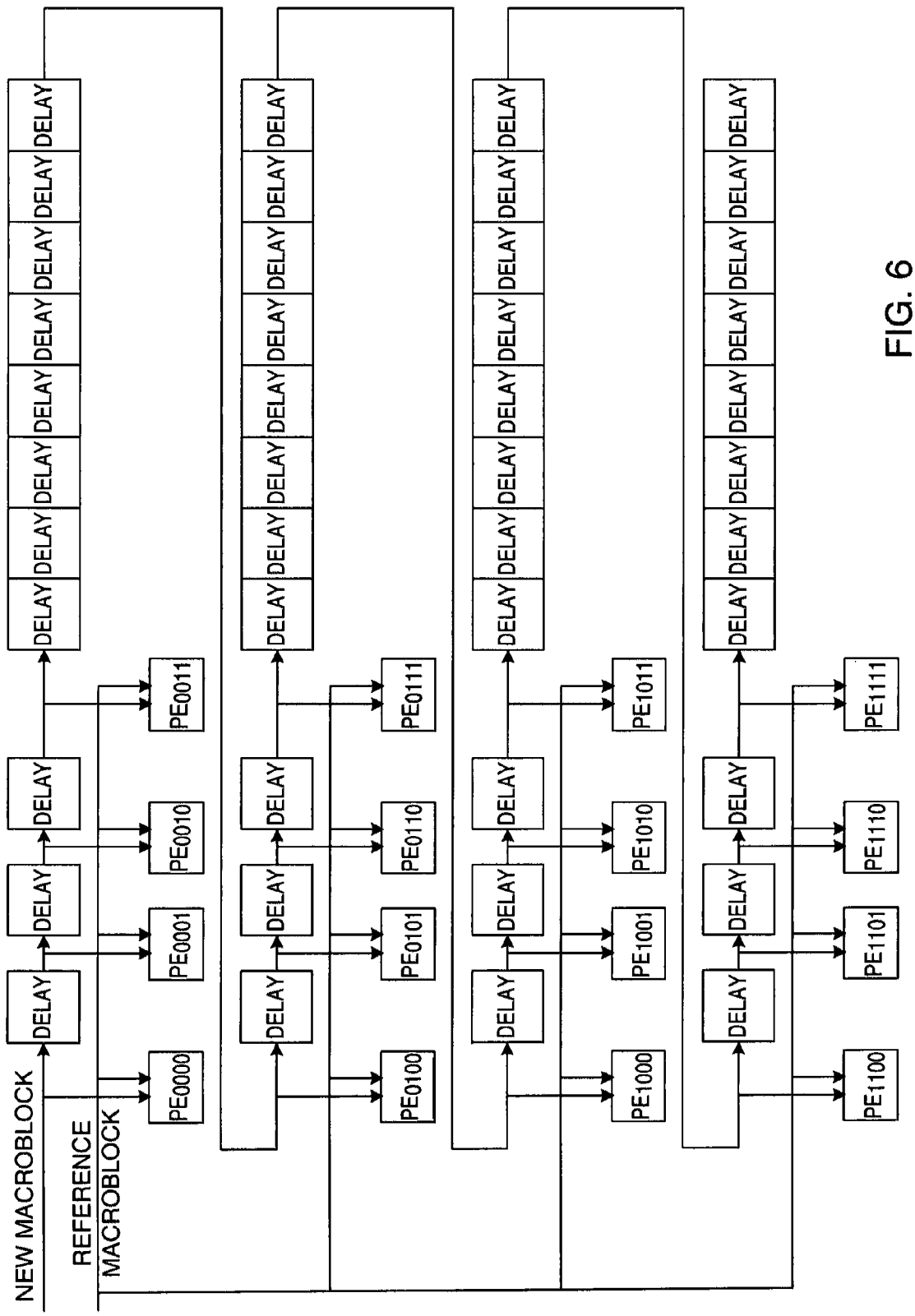
FIG. 6 exemplifies an alternate embodiment of an adaptive systolic array structure in accordance with an embodiment of the present invention.

Turning to FIG. 6, an alternate embodiment of an adaptive systolic array structure is exemplified, whereby the correct systolic array structure is derived based upon certain design parameters as may be required by a particular motion estimation algorithm. A first design parameter defines the size of the new macroblock, which may be of any arbitrary size. A second design parameter defines the size and shape of the processing element array. For example, the size of the processing element array as discussed above in relation to FIG. 5 is 2×2, thus exhibiting a square shape. As discussed in more detail below, however, the shape of the PE array may also be of any arbitrary shape as well.

Given that the new macroblock has a width of NW and a height of NH and that a processing element array has a width of AW and a height of AH, then the minimum search area requires a width of NW+AW−1 and a height of NH+AH−1. Thus, the minimum search area, i.e., the active search area, is a subset of the full search area and may be provided to, e.g., search area 106, in sub-blocks as requested by, e.g., search area copy control 102.

Thus, given that a first design parameter defines a new macroblock size of 8×8 and a second design parameter defines a processing element array size of 4×4, then the active search area is defined to exhibit a square shape having a height of 11 pixels and a width of 11 pixels. The number of clock cycles that are needed to perform all SAD calculations within the active search area is defined by equation (3):

$$\text{Total number of clock cycles} = (NW+AW-1)*(NH+AH-1), \quad (3)$$

which is equal to 121 clock cycles for the example of FIG. 6. It is also verified, that the number of delay elements that are required by each delay line of the systolic array structure may be determined from the width of the active search area, which for the example of FIG. 6, is 11 pixels, thus requiring 11 delay elements. The example of FIG. 5, on the other hand, utilizes an active search width of 9 pixels, thus requiring 9 delay elements. It is further noted, that the number of delay elements that are required by each delay line of the systolic array structure is also dependent upon the new macroblock width and the processing element array width, since the width of the active search area is determined from these two parameters as discussed above.

The correct data routing for the systolic structure of FIG. 6 may also be generated from the associated schedule map. In particular, it can be verified that the first pixel, $X_{11}$, of the new macroblock is required by $PE_{0000}$ during the first clock cycle in order to perform the SAD calculation during clock cycle 1. Similarly, pixel $X_{11}$ is required by $PE_{0001}$, $PE_{0010}$, and $PE_{0011}$ during the next 3 clock cycles, respectively, and therefore, must be preserved in the appropriate number of delay elements so that pixel $X_{11}$ may be provided to the correct processing elements at the correct time in accordance with the scheduling map. Similar data routing and associated delay elements may be verified as illustrated in FIG. 6 for $PE_{0100}$-$PE_{1111}$. As discussed in more detail below, the absolute difference calculations performed in accordance with the scheduling map are unique and thus may also be reused as necessary during subsequent algorithmic refinements.

In particular, the adaptive systolic structure presented herein lends itself to customization, whereby any given systolic array structure may be reconfigured as necessary without imposing significant modifications to the structure. Various circumstances, such as resource usage, or algorithmic decisions, for example, may require candidate position searches that do not utilize rectangular search patterns as previously discussed. In other words, any search pattern may be configured simply by enabling, or disabling, one or more processing elements within the processing element array.

Turning to FIG. 7A, an exemplary adaptive systolic array structure is illustrated, which facilitates the required search pattern by applying one or more processing elements in the correct orientation with respect to the associated delay elements. By generating a scheduling map that corresponds to the systolic array structure of FIG. 7A, as similarly discussed above in relation to FIGS. 2A-5A, it can be verified that the sparse search pattern 750 of FIG. 7B is realized.

In particular, it is noted that the configuration of processing elements 702-706 and associated delay elements yield active sub-regions 752-756, respectively, along the entire first row of sparse search area 750. In addition, the configuration of processing elements 708-710 and associated delay elements yield active sub-regions 758 and 760, respectively, along the second and third row positions of the first column of sparse search area 750. The remaining sub-regions of search area 750 remain inactive due to the non-existence of corresponding processing elements within the adaptive systolic array structure of FIG. 7A. Thus, sparse search pattern 750 of FIG. 7B as generated by the systolic array structure of FIG. 7A yields an upper-left-hand-corner active search area.

It can be seen, therefore, that by appropriate positioning of processing elements within the adaptive systolic array structure, a plurality of sparse search patterns may be obtained, as exemplified in FIGS. 8-11. Although several search pattern embodiments are illustrated in FIGS. 8-11, it is understood that a plurality of alternate search patterns may be similarly obtained.

Turning to FIG. 8A, an alternate embodiment of an adaptive systolic array structure is illustrated, which facilitates the required search pattern by applying one or more processing elements in the correct orientation with respect to associated delay elements. By generating a scheduling map that corresponds to the systolic array structure of FIG. 8A, it can be verified that the sparse search pattern 850 of FIG. 8B is realized.

In particular, it is noted that that the configuration of processing elements 802-806 and associated delay elements yield active sub-regions 852-856, respectively, along the entire first row of sparse search area 850. In addition, the configuration of processing elements 808-810 and associated delay elements yield active sub-regions 858 and 860, respectively, along the second and third row positions of the third column of sparse search area 850. The remaining sub-regions of search area 850 remain inactive due to the non-existence of corresponding processing elements within the adaptive systolic array structure of FIG. 8A. Thus, sparse search pattern 850 of FIG. 8B as generated by the systolic array structure of FIG. 8A yields an upper-right-hand-corner active search area.

Turning to FIG. 9A, an alternate embodiment of an adaptive systolic array structure is illustrated, which facilitates the required search pattern by applying one or more processing elements in the correct orientation with respect to associated delay elements. By generating a scheduling map that corresponds to the systolic array structure of FIG. 9A, it can be verified that the sparse search pattern 950 of FIG. 9B is realized.

In particular, it is noted that the configuration of processing elements 902-906 and associated delay elements yield active sub-regions 952-956, respectively, along the entire first column of sparse search area 950. In addition, the configuration of processing elements 908-910 and associated delay elements yield active sub-regions 958 and 960, respectively, along the second and third column positions of the third row of sparse search area 950. The remaining sub-regions of search area 950 remain inactive due to the non-existence of corresponding processing elements within the adaptive systolic array structure of FIG. 9A. Thus, sparse search pattern 950 of FIG. 9B as generated by the systolic array structure of FIG. 9A yields a lower-left-hand-corner active search area.

Figures 10A, 10B:
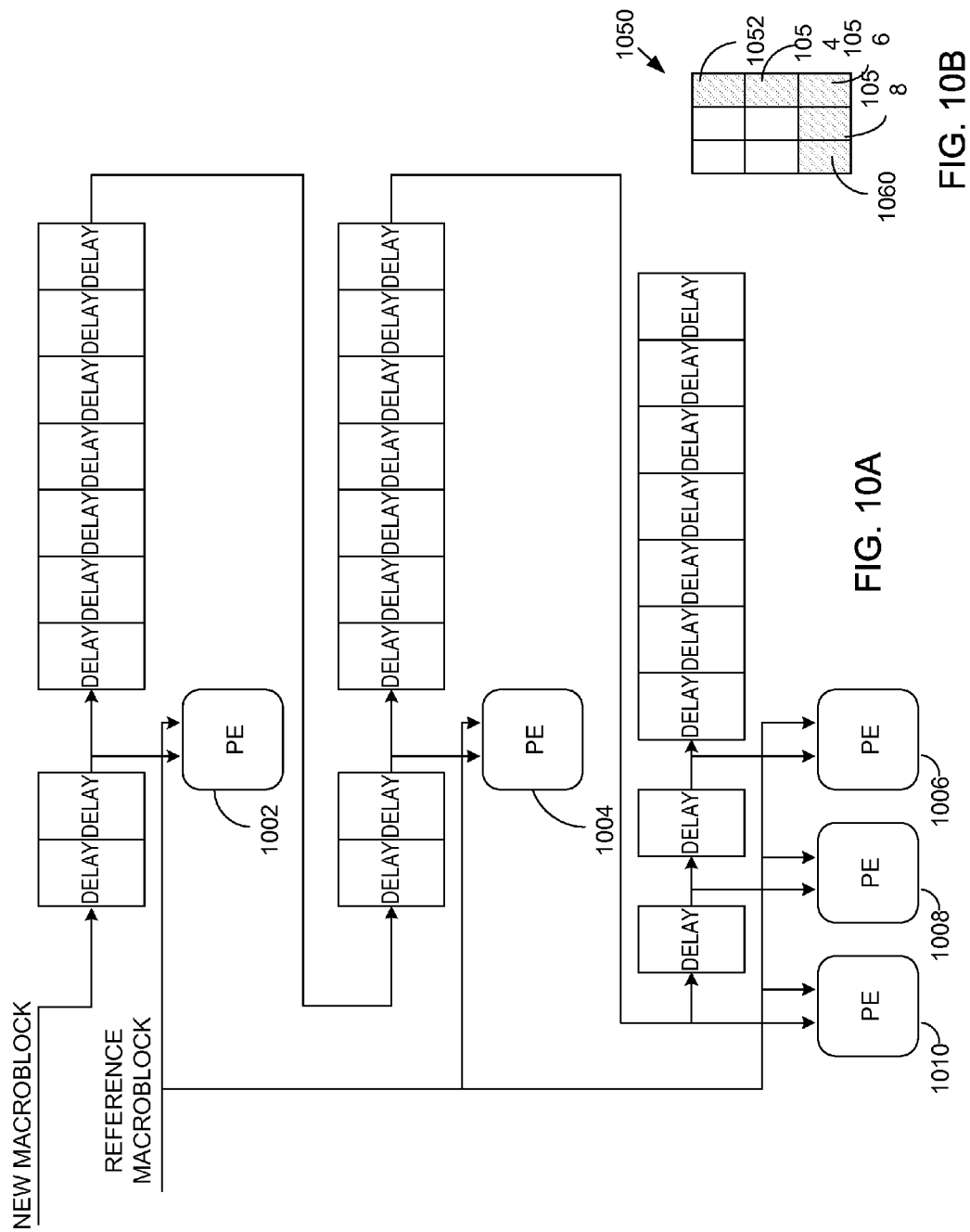
FIG. 10A exemplifies an alternate embodiment of an adaptive systolic array structure.
FIG. 10B exemplifies an alternate sparse search pattern that is realized by the adaptive systolic array structure of FIG. 10A.

Turning to FIG. 10A, an alternate embodiment of an adaptive systolic array structure is illustrated, which facilitates the required search pattern by applying one or more processing elements in the correct orientation with respect to associated delay elements. By generating a scheduling map that corresponds to the systolic array structure of FIG. 10A, it can be verified that the sparse search pattern 1050 of FIG. 10B is realized.

In particular, it is noted that the configuration of processing elements 1002-1006 and associated delay elements yield active sub-regions 1052-1056, respectively, along the entire third column of sparse search area 1050. In addition, the configuration of processing elements 1008-1010 and associated delay elements yield active sub-regions 1058 and 1060, respectively, along the first and second column positions of the third row of sparse search area 1050. The remaining sub-regions of search area 1050 remain inactive due to the non-existence of corresponding processing elements within the adaptive systolic array structure of FIG. 10A. Thus, sparse search pattern 1050 of FIG. 10B as generated by the systolic array structure of FIG. 10A yields a lower-right-hand-corner active search area.

Figure 11:
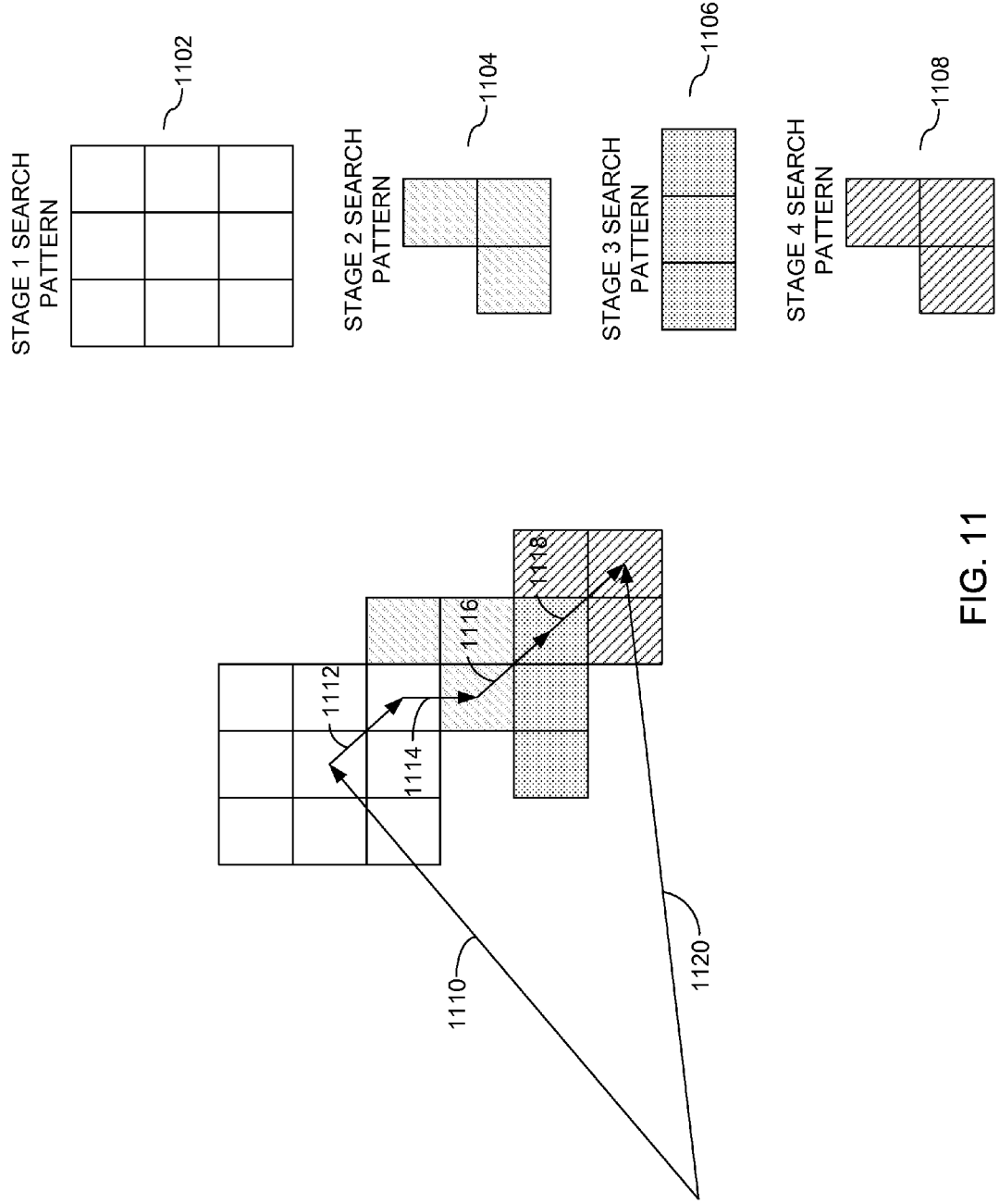
FIG. 11 exemplifies a directional motion estimation algorithm that adapts the search pattern facilitated by the adaptive systolic array structure of FIG. 1 as each stage of the search progresses.

In an alternate embodiment, the adaptive systolic array architecture provided herein may be utilized by a directional motion estimation algorithm, as exemplified in FIG. 11, that adapts the search pattern as the algorithm progresses. Turning to FIG. 11, an adaptive motion estimation algorithm may initially utilize 3×3 search pattern 1102, which may be obtained by appropriate placement of a 3×3 array of processing elements and associated delay elements as generally discussed above in relation to FIGS. 5-10. Initial motion vector 1110 is used to center stage 1 search pattern 1102 within the active search area, whereby after the first search stage, the motion estimation algorithm modifies initial motion vector 1110 via displacement motion vector 1112 to obtain a modified motion estimate.

During a second search stage, the motion estimation algorithm may modify the search pattern from stage 1 search pattern 1102 to stage 2 search pattern 1104. In particular, the motion estimation algorithm must specify to the adaptive systolic array architecture as to which configuration of processing elements and associated delay elements is needed to effect search pattern 1104. In response, the adaptive systolic array architecture may then be reconfigured in accordance with the required configuration and then proceed with the stage 2 search, whereby displacement motion vector 1112 is modified via displacement motion vector 1114 to obtain yet another modified motion estimate.

During third and fourth search stages, the motion estimation algorithm may sequentially modify the search patterns from stage 2 search pattern 1104 to stage 3 search pattern 1106 and stage 4 search pattern 1108, respectively. In particular, the motion estimation algorithm similarly specifies to the adaptive systolic array architecture as to which configurations of processing elements and associated delay elements are needed to effect search patterns 1106 and 1108. In response, the adaptive systolic array architecture may be reconfigured in accordance with the required configurations so that the adaptive motion estimation algorithm may proceed with the stage 3 and stage 4 searches, whereby displacement motion vector 1114 is modified via displacement motion vectors 1116 and 1118 to obtain the final motion estimate, as represented by final motion vector 1120.

In one embodiment, the reconfiguration of the adaptive systolic array architecture to obtain various sparse search patterns, as discussed above in relation to FIG. 11, may be effected via a programmable logic device (PLD) during sequential dynamic reconfiguration events. In such an instance, that portion of the PLD that implements the adaptive systolic array architecture may be dynamically reconfigured in accordance with the requirements of the adaptive motion estimation algorithm, while the other portions of the PLD retain their current configuration and remain active during the dynamic reconfiguration events.

Figure 12:
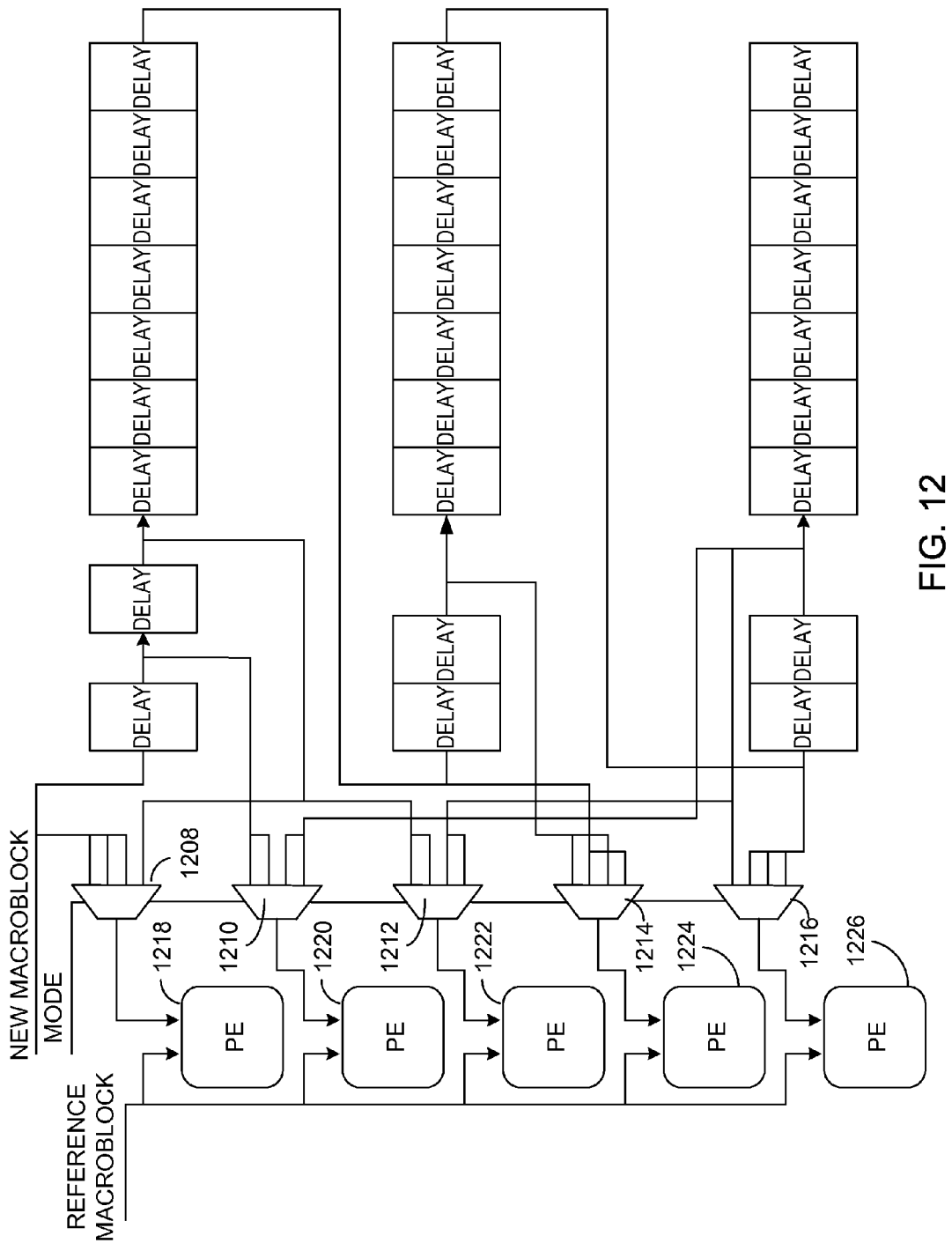
FIG. 12 exemplifies a pre-determined set of configurations that may be selected by the exemplary directional motion estimation algorithm of FIG. 11.

In an alternate embodiment, as exemplified in FIG. 12, a pre-determined set of configurations may be determined and then multiplexed to allow the adaptive motion estimation algorithm to sequence between alternate configurations during each search stage of a multi-stage search. For example, given that sparse search pattern 850 of FIG. 8B is required by the adaptive motion estimation algorithm to generate an upper-right-hand-corner active search area, then signal MODE may be asserted to a logic 0, such that the first input of each multiplexer 1208-1216 is selected.

In such an instance, PE 1218 corresponds to PE 802 of FIG. 8A, since PE 1218 receives pixels from the new macroblock without delay, as provided by multiplexer 1208. In addition, PE 1220 corresponds to PE 804 of FIG. 8A, since PE 1220 receives pixels from the new macroblock that are delayed by one delay element, as provided by multiplexer 1210. Furthermore, PE 1222 corresponds to PE 806 of FIG. 8A, since PE 1222 receives pixels from the new macroblock that are delayed by two delay elements, as provided by multiplexer 1212. Lastly, PEs 1224 and 1226 correspond to PEs 808 and 810 of FIG. 8A, respectively, since PE 1224 receives pixels from the new macroblock that are delayed by eleven delay elements, as provided by multiplexer 1214, and PE 1226 receives pixels from the new macroblock that are delayed by twenty delay elements, as provided by multiplexer 1216.

It is understood that the particular delay line configurations and associated PE interconnects may be pre-determined to accommodate a plurality of systolic array architectures that are not explicitly illustrated by FIG. 12. Through appropriate selection of signal MODE, the adaptive motion estimation algorithm may then adapt the systolic array architecture to perform a plurality of searches using a plurality of adaptively selected active search areas.

Figure 13:
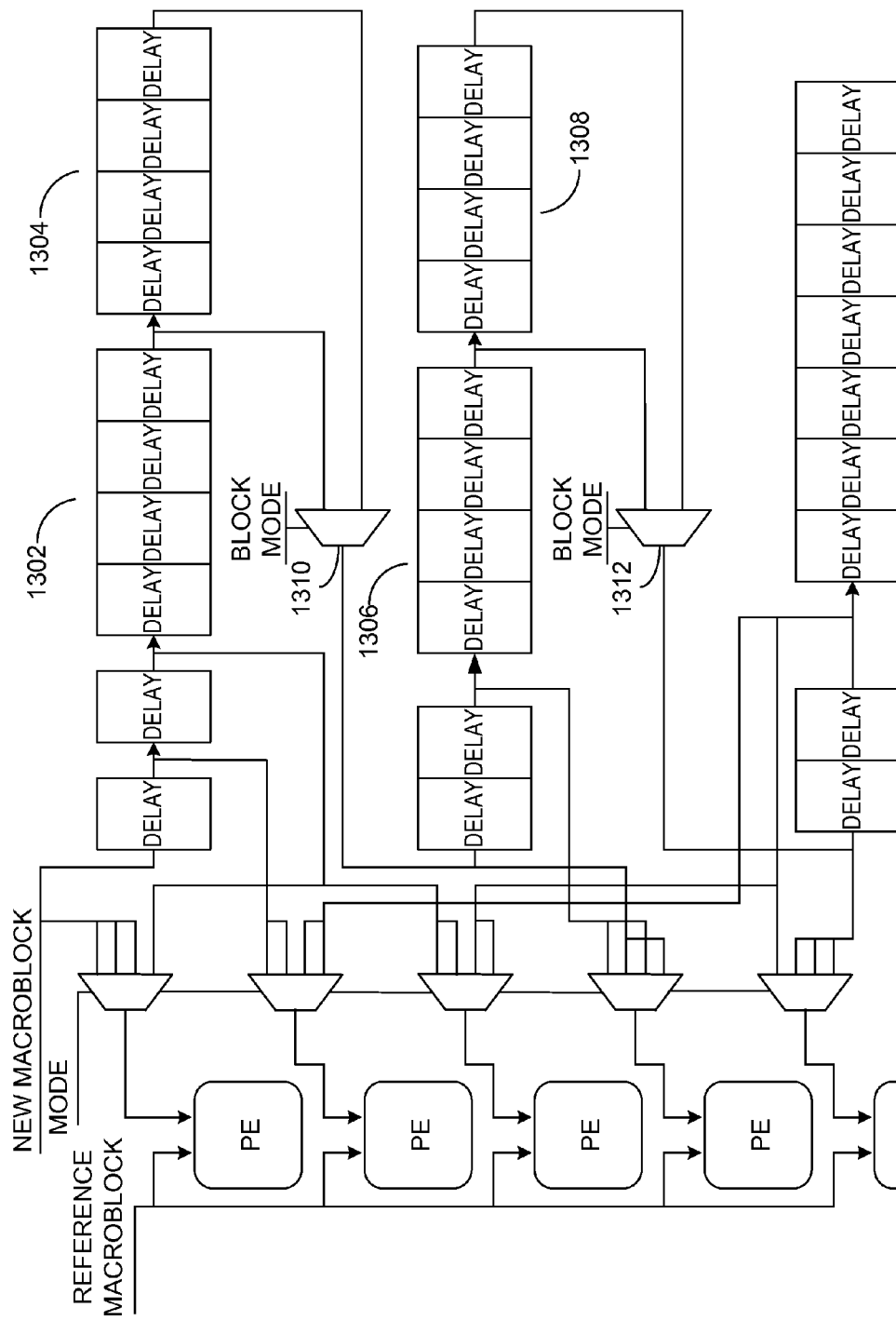
FIG. 13 exemplifies an alternate embodiment of a pre-determined set of configurations that may be selected by the exemplary directional motion estimation algorithm of FIG. 11.

In an alternate embodiment, the exemplary set of multiplexed configurations of FIG. 12 may be further configured to allow the adaptive motion estimation algorithm to select from a wide variety of block types. For example, the H.264 encoding algorithm requires that the motion estimation algorithm support a wide range of block types, such as 16×16, 16×8, 8×16, 8×8, 8×4, 4×8, and 4×4. As previously discussed, the length of the delay line utilized by a particular systolic array structure depends upon the width of the active search area, which as discussed above, is dependent upon the block type of the new macroblock and the size of the processing element array. Thus, as exemplified in FIG. 13, the adaptive motion estimation algorithm may select the number of delay elements required by appropriate assertion of signal BLOCK MODE in response to the block type being used.

For example, a configurable number of delay elements may be configured within delay lines 1302 and 1306 to accommodate a first block type and a configurable number of delay elements may be configured within delay lines 1304 and 1308 to accommodate a second block type. By appropriate selection of signal BLOCK MODE, two different block types may be accommodated. Thus, by appropriately asserting the logic value of signal BLOCK MODE, the adaptive motion estimation algorithm may invoke as many delay elements as are required in response to the block type being utilized. It is understood that while delay lines 1302-1308 implement four delay elements each, the actual number of delay elements implemented within each delay line may be reconfigured depending upon the block types that may be encountered during each search stage. It is further understood that any number of delay lines may be selected by increasing the number of inputs to multiplexers 1310 and 1312.

Figure 14:
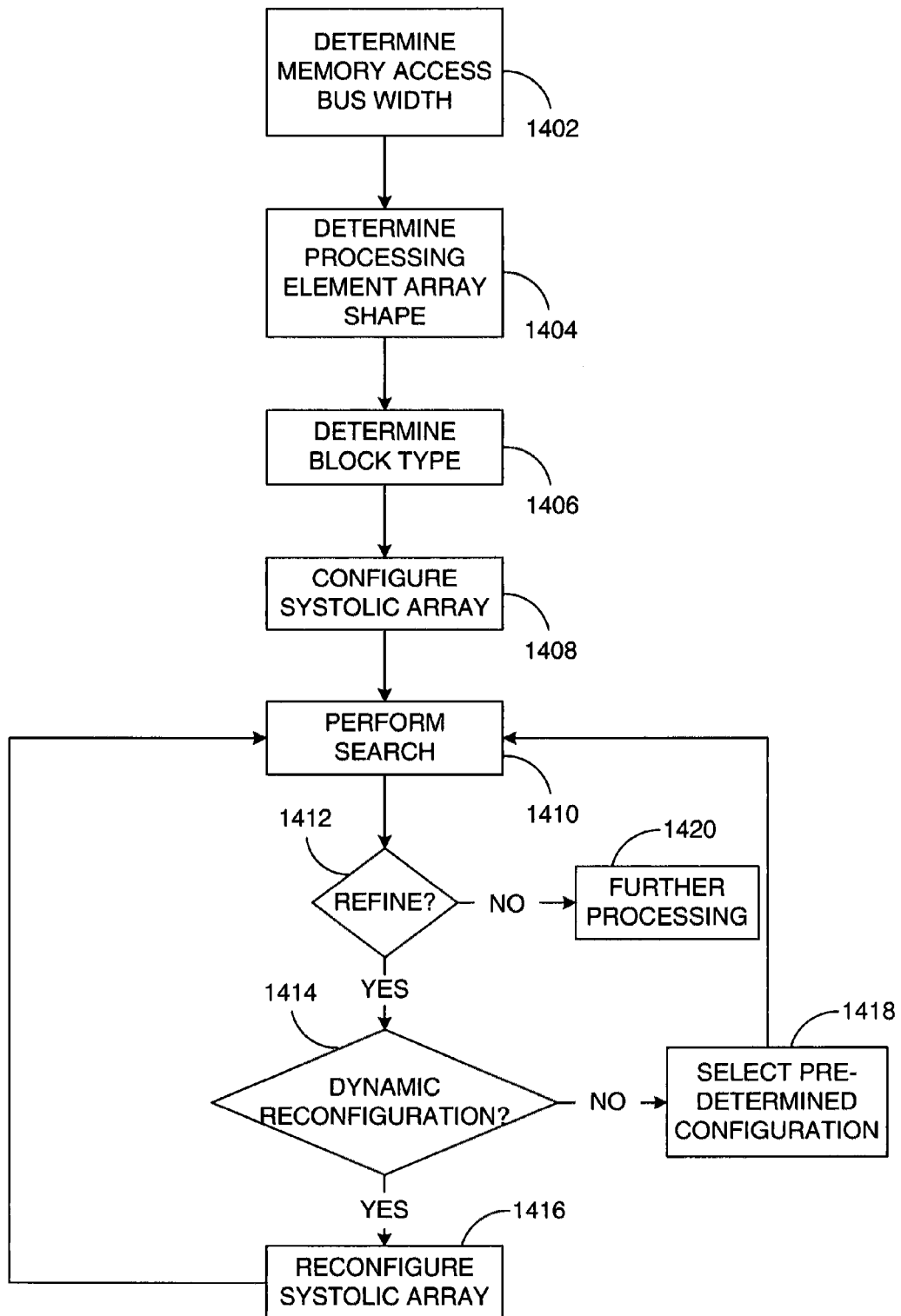
FIG. 14 illustrates a flow diagram of the configuration and optional reconfiguration of an exemplary adaptive systolic array structure as directed by an exemplary motion estimation algorithm in accordance with an embodiment of the present invention.

Turning to FIG. 14, a flow diagram of an exemplary adaptive motion estimation algorithm is illustrated, whereby a systolic array structure is initially configured and adapted as required throughout all search stages. In step 1402, the memory access bus width is determined, whereby as discussed above in relation to FIGS. 2-4, pixels may be accessed from new macroblock 104 and search area 106 in groups of, e.g., 1, 2, or 4 pixels, which corresponds to memory access bus widths of, e.g., 8, 16, or 32 bits. Once the memory access bus width is determined, the processing element structure may be configured, for example, as an 8-bit, 16-bit, or 32-bit, SAD processing element as discussed above in relation to FIGS. 2B, 3B, and 4B, respectively. It is noted that other processing element types may instead be configured to calculate other metric data, such as least mean squared error.

In step 1404, the processing element array shape, or candidate position, is selected to determine the search pattern to be utilized, which may be of virtually any arbitrary shape. Turning to FIG. 5, for example, the search pattern implemented by the processing element array is square with a 2×2 array size. In FIG. 6, on the other hand, a square, 4×4 array size is instead selected. In FIGS. 7B-10B, exemplary sparse search patterns are realized through implementation of associated processing element placement and delay line interconnect. Turning to FIGS. 15A-15F, other search patterns are exemplified that may be realized by arranging the processing element array within each delay line as required.

Figure 15A:
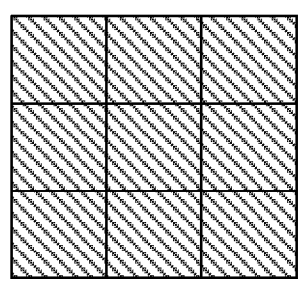
FIG. 15 illustrates exemplary search patterns that may be generated by arranging the processing element array of the adaptive systolic array structure of FIG. 1.
Figure 15B:
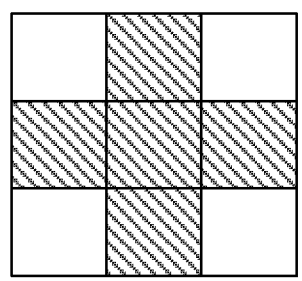
Figure 15C:
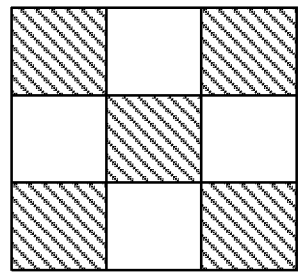
Figure 15D:
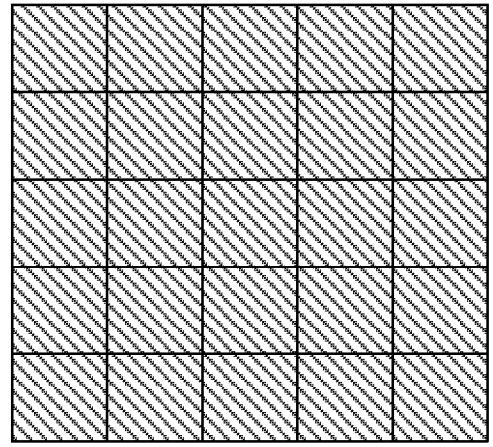
Figure 15E:
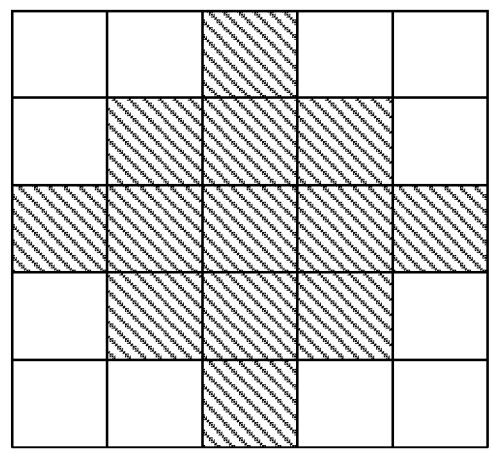
Figure 15F:
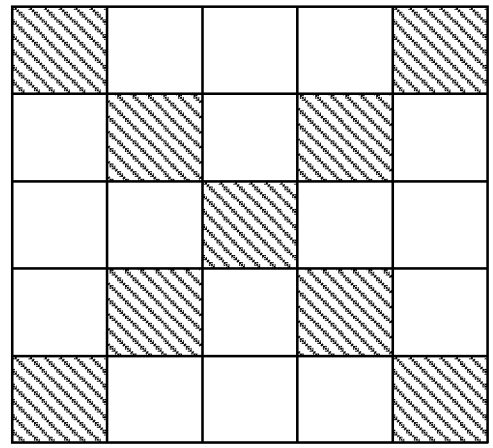

For example, the search pattern of FIG. 15A may be generated by a 3×3 processing element array that is appropriately interconnected with a delay line as is generally discussed above. If a refinement of the search pattern is required, as discussed below in relation to steps 1412-1418, then a portion of the processing elements as configured in FIG. 15A may simply be removed to generate the small diamond shape of FIG. 15B, or the small cross shape of FIG. 15C. Conversely, the search pattern of FIG. 15D may be realized by a 5×5 processing element array that is appropriately interconnected with a delay line as generally discussed above. If a refinement of the search pattern is required, as discussed below in relation to steps 1412-1418, then a portion of the processing elements as configured in FIG. 15D may simply be removed to generate the large diamond shape of FIG. 15E, or the large cross shape of FIG. 15F. It is understood that virtually any sparse search patterns may instead be realized by arranging the processing element array within each delay line as required.

In step 1406, the block type is determined. In particular, given that the new macroblock has a width of NW and a height of NH and that the search pattern has a width of AW and a height of AH, then the minimum search area requires a width of NW+AW−1 and a height of NH+AH−1. Thus, the minimum search area, i.e., the active search area, is a subset of the full search area and may be provided to, e.g., search area 106, in sub-blocks as requested by, e.g., search area copy control 102.

Once the block type is determined, then the systolic array, e.g., processing block 108, may be configured for operation in step 1408 by the adaptive motion estimation algorithm. In particular, the number of delay elements to be utilized may be configured depending upon the active search area that is to be searched. As discussed above, the number of delay elements is equal to the width of the active search area, which is further determined from the block type of step 1406. Next, the processing element array may be interconnected within the delay elements as determined by the particular scheduling map that is to be implemented. The data routing structure of FIG. 5, for example, is derived from the data dependencies as illustrated by the scheduling map of FIG. 2A to implement data routing block 114.

In step 1410, the motion estimation search may commence. The motion estimation algorithm utilizes the motion estimation structure of FIG. 1 by providing a predicted motion vector from algorithm control 112, whereby the predicted motion vector represents the predicted displacement between a macroblock in the current video frame, e.g., new macroblock 104, and a macroblock in the reference video frame, e.g., as contained within search area 106.

Based upon the predicted motion vector, search area copy control 102 extracts the appropriate reference frame data from external memory, as determined in step 1406, and applies the reference frame to search area 106. The pixels from the search area, as well as the pixels from new macroblock 104, are then provided to processing block 108. Pixels from the search area and pixels from the new macroblock are then routed to their respective processing elements (PEs) by data routing block 114, as configured in step 1408, to perform calculations as required by the particular motion estimation algorithm being implemented. In one embodiment, the motion estimation algorithm employs the SAD metric to determine the SAD value as it relates to the pixels of new macroblock 104 and the pixels contained within search area 106.

Once the PE computations are performed, SAD compare 110 compares the output of processing blocks 116-122 to determine which of the SAD outputs is minimized. The minimum SAD value, e.g., BEST SAD, is then provided to algorithm control 112, where the determination is made in step 1412 as to whether another search stage is required. If not, the optimal motion vector, e.g., BEST MV, and associated SAD value, e.g., BEST SAD, is provided by algorithm control 112 to be further processed in step 1420 as necessary.

If additional search stages are required, then the systolic structure of FIG. 1 may be optionally adapted to further refine search design parameters, such as new macroblock size, processing element array size and shape, and active search area, to adapt the search strategy as required by the motion estimation algorithm. In one embodiment, dynamic reconfiguration may be selected as in step 1414, whereby the systolic array may be dynamically reconfigured in step 1416 while other portions of the FPGA remain active. In an alternate embodiment, pre-determined configurations may instead be selected by the adaptive motion estimation algorithm, as discussed above in relation to FIGS. 12 and 13, via signals MODE and BLOCK MODE to reconfigure the systolic array in accordance with the requirements of the motion estimation algorithm. FIG. 11, for example, exemplifies a 4-stage search, whereby 3×3 search pattern 1102 yields initial motion vector 1110 and sparse search patterns 1104-1108 are subsequently utilized by the motion estimation algorithm to ultimately achieve refined motion vector 1120.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. An adaptive motion estimation structure, comprising:
a first memory block coupled to receive pixels indicative of a reference video frame;
a second memory block coupled to receive pixels indicative of a current video frame;
a processing block coupled to the first and second memory blocks, the processing block including,
a data routing block coupled to receive pixels from the first and second memory blocks, the data routing block adapted to store pixels from the second memory block in accordance with a scheduling map; and
an array of processing elements coupled to the data routing block, the array of processing elements receiving pixels from the first and second memory blocks at time intervals defined by the scheduling map; and
wherein a programmable configuration of the array of processing elements determines a search pattern used to estimate a difference between the reference and current video frames; and
wherein the search pattern is adaptively altered in response to the estimated difference.

2. The adaptive motion estimation structure of claim 1, wherein the data routing block comprises a delay line having a programmable number of delay elements, the delay line coupled to receive each pixel of the second memory block and adapted to delay each pixel of the second memory block by the number of time intervals defined by the scheduling map.

3. The adaptive motion estimation structure of claim 2, wherein the programmable number of delay elements in the delay line is dependent upon a size of the second memory block.

4. The adaptive motion estimation structure of claim 3, wherein the programmable number of delay elements in the delay line is further dependent upon a size of the array of processing elements.

5. The adaptive motion estimation structure of claim 2, wherein the programmable number of delay elements in the delay line are selectively coupled to the array of processing elements and adapted to deliver pixels from the second memory block to the array of processing elements in accordance with the time intervals defined by the scheduling map.

6. The adaptive motion estimation structure of claim 5, wherein the programmable number of delay elements are arranged in groups of delay elements.

7. The adaptive motion estimation structure of claim 6, further comprising a first plurality of multiplexers, wherein each group of delay elements is coupled to an input of one of the plurality of multiplexers.

8. The adaptive motion estimation structure of claim 7, wherein a select input to the first plurality of multiplexers activates at least one group of delay elements to implement the time intervals defined by the scheduling map.

9. The adaptive motion estimation structure of claim 8, wherein each processing element of the array of processing elements is adapted to receive a programmable number of pixels from the first and second memory blocks during each time interval defined by the scheduling map.

10. The adaptive motion estimation structure of claim 9, wherein the array of processing elements is selectively coupled to each delay element of the delay line to generate the search pattern.

11. The adaptive motion estimation structure of claim 10, further comprising a second plurality of multiplexers, each multiplexer of the second plurality of multiplexers having an output coupled to one processing element of the array of processing elements.

12. The adaptive motion estimation structure of claim 11, wherein a select input to the second plurality of multiplexers selectively couples each processing element of the array of processing elements to each delay element of the delay line to generate the search pattern.

13. A method of adapting a motion estimation structure to perform an adaptive motion estimation algorithm, the method comprising:
configuring a programmable number of processing elements of a processing element array to process a programmable number of pixels from a reference video frame and a current video frame during each time interval defined by a scheduling map;
configuring a programmable number of delay elements of a delay line to deliver the programmable number of pixels to the array of processing elements at each time interval defined by the scheduling map; and
selectively interconnecting the processing element array to the delay line to generate a search pattern used to estimate a difference between the reference and current video frames; and
adaptively altering the search pattern in response to the estimated difference.

14. The method of claim 13, wherein the act of adaptively altering the search pattern comprises selecting a predetermined configuration of processing elements of the processing element array and delay elements of the delay line.

15. An adaptive motion estimation system, comprising:
a first memory block coupled to receive pixels indicative of a reference video frame;
a second memory block coupled to receive pixels indicative of a current video frame;
an integrated circuit coupled to the first and second memory blocks, the integrated circuit including,
a data routing block coupled to receive pixels from the first and second memory blocks, the data routing block adapted to store pixels from the second memory block in accordance with a scheduling map;
an array of processing elements coupled to the data routing block, the array of processing elements receiving pixels from the first and second memory blocks at time intervals defined by the scheduling map; and
wherein a programmable configuration of the array of processing elements determines a search pattern used to estimate a difference between the reference and the current video frames, and
wherein the search pattern is adaptively altered in response to the estimated difference.

16. The adaptive motion estimation system of claim 15, wherein the data routing block comprises a delay line having a programmable number of delay elements, the delay line coupled to receive each pixel of the second memory block and adapted to delay each pixel by the number of time intervals defined by the scheduling map.

17. The adaptive motion estimation system of claim 16, wherein the array of processing elements is selectively coupled to each delay element of the delay line to generate the search pattern.

18. The adaptive motion estimation system of claim 17, wherein the array of processing elements and the delay line are dynamically reconfigured within the integrated circuit in response to the estimated difference.

19. The adaptive motion estimation system of claim 17, wherein predetermined configurations of the array of processing elements and delay elements are selected in response to the estimated difference.

* * * * *